(12) United States Patent
Sahara et al.

(10) Patent No.: US 12,228,675 B2
(45) Date of Patent: Feb. 18, 2025

(54) ELECTRONIC DEVICE, METHOD FOR CONTROLLING ELECTRONIC DEVICE, AND ELECTRONIC DEVICE CONTROL PROGRAM

(71) Applicant: KYOCERA Corporation, Kyoto (JP)

(72) Inventors: Tooru Sahara, Yokohama (JP); Masamitsu Nishikido, Yokohama (JP); Youhei Murakami, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 896 days.

(21) Appl. No.: 17/274,290

(22) PCT Filed: Sep. 18, 2019

(86) PCT No.: PCT/JP2019/036631
§ 371 (c)(1),
(2) Date: Mar. 8, 2021

(87) PCT Pub. No.: WO2020/059767
PCT Pub. Date: Mar. 26, 2020

(65) Prior Publication Data
US 2021/0325506 A1  Oct. 21, 2021

(30) Foreign Application Priority Data

Sep. 20, 2018 (JP) .................. 2018-176513
Sep. 25, 2018 (JP) .................. 2018-179002

(51) Int. Cl.
*G01S 7/03* (2006.01)
*G01S 7/40* (2006.01)
*G01S 13/32* (2006.01)

(52) U.S. Cl.
CPC ............... *G01S 7/03* (2013.01); *G01S 7/40* (2013.01); *G01S 13/32* (2013.01)

(58) Field of Classification Search
CPC ............................. G01S 7/03; G01S 7/52006
See application file for complete search history.

(56) References Cited

U.S. PATENT DOCUMENTS

| 7,496,158 | B2 | 2/2009 | Fudge et al. |
| 7,804,441 | B1 | 9/2010 | DeChiaro, Jr. |
| 8,014,476 | B2 | 9/2011 | Filipovic et al. |
| 8,174,430 | B1 | 5/2012 | DeChiaro, Jr. |

(Continued)

FOREIGN PATENT DOCUMENTS

| DE | 19850639 A1 * | 5/1999 | ............ B60S 1/0848 |
| EP | 1 912 080 A2 | 4/2008 | |

(Continued)

*Primary Examiner* — Vladimir Magloire
*Assistant Examiner* — Eric K Hodac
(74) *Attorney, Agent, or Firm* — Studebaker & Brackett PC

(57) ABSTRACT

An electronic device comprises: a transmitting antenna configured to transmit transmitted waves, a receiving antenna configured to receive reflected waves obtained by reflection of the transmitted waves; and a controller. The controller detects, based on transmitted signals transmitted as the transmitted waves and received signals received as the reflected waves, an object reflecting the transmitted waves. The controller determines frequencies of transmitted waves to be transmitted from the transmitting antenna based on temperature.

13 Claims, 13 Drawing Sheets

(56) References Cited

U.S. PATENT DOCUMENTS

| | | |
|---|---|---|
| 8,223,802 B2 | 7/2012 | Djahanshahi et al. |
| 8,265,799 B2 | 9/2012 | Eto |
| 8,593,540 B2 | 11/2013 | Stirling-Gallacher |
| 9,367,785 B2 | 6/2016 | Sabesan et al. |
| 9,395,434 B2 | 7/2016 | Mazzaro et al. |
| 9,866,816 B2 | 1/2018 | Retterath |
| 10,027,365 B2 | 7/2018 | Yun |
| 10,067,221 B2 | 9/2018 | Ginsburg et al. |
| 10,127,462 B1 | 11/2018 | Pratt et al. |
| 10,139,837 B2 | 11/2018 | Qin et al. |
| 10,298,908 B2 | 5/2019 | Retterath |
| 10,310,065 B2 | 6/2019 | Okamoto |
| 10,382,742 B2 | 8/2019 | Retterath |
| 10,393,871 B2 | 8/2019 | Bilik et al. |
| 10,444,341 B2 | 10/2019 | Bilik et al. |
| 10,571,280 B2 | 2/2020 | Pratt et al. |
| 10,612,199 B2 | 4/2020 | Pratt et al. |
| 10,725,166 B2 | 7/2020 | Saito |
| 11,169,264 B2 | 11/2021 | Crew et al. |
| 11,320,517 B2 | 5/2022 | Rimini et al. |
| 11,385,321 B2 | 7/2022 | Lin et al. |
| 2007/0081611 A1 | 4/2007 | Fudge et al. |
| 2007/0104298 A1 | 5/2007 | Filipovic et al. |
| 2011/0058535 A1 | 3/2011 | Djahanshahi et al. |
| 2011/0273585 A1 | 11/2011 | Stirling-Gallacher |
| 2013/0005280 A1 | 1/2013 | Leung et al. |
| 2013/0201003 A1 | 8/2013 | Sabesan et al. |
| 2015/0253415 A1 | 9/2015 | Mazzaro et al. |
| 2016/0291130 A1 | 10/2016 | Ginsburg et al. |
| 2017/0097409 A1 | 4/2017 | Okamoto |
| 2017/0350970 A1 | 12/2017 | Saito |
| 2018/0019782 A1 | 1/2018 | Yun |
| 2018/0074519 A1 | 3/2018 | Qin et al. |
| 2018/0164423 A1 | 6/2018 | Bilik et al. |
| 2018/0328741 A1 | 11/2018 | Pratt et al. |
| 2018/0329033 A1 | 11/2018 | Pratt et al. |
| 2018/0330174 A1 | 11/2018 | Pratt et al. |
| 2019/0011533 A1 | 1/2019 | Ginsburg et al. |
| 2019/0107844 A1 | 4/2019 | Qin et al. |
| 2021/0055385 A1 | 2/2021 | Rimini et al. |
| 2021/0063569 A1 | 3/2021 | Crew et al. |
| 2021/0325506 A1 | 10/2021 | Sahara et al. |
| 2022/0317276 A1 | 10/2022 | Mitsumoto et al. |

FOREIGN PATENT DOCUMENTS

| | | | |
|---|---|---|---|
| JP | H11-133144 A | 5/1999 | |
| JP | 2006064628 A * | 3/2006 | ............... G01S 7/40 |
| JP | 2009-137503 A | 6/2009 | |
| JP | 2009-281775 A | 12/2009 | |
| JP | 2010-078375 A | 4/2010 | |
| JP | 2010181229 A * | 8/2010 | ............... G01S 7/02 |
| JP | 2010-211269 A | 9/2010 | |
| TW | 201437661 A * | 10/2014 | ............. G01S 13/34 |
| WO | WO-2016170007 A1 * | 10/2016 | ........... A61B 5/0017 |
| WO | 2020/059767 A1 | 3/2020 | |

\* cited by examiner

FIG. 7

| FREQUENCY BAND [GHz] | CENTER FREQUENCY [GHz] | INTENSITY OF RECEIVED SIGNAL [dB] |
|---|---|---|
| 77.0 ~ 77.5 | 77.25 | a |
| 77.5 ~ 78.0 | 77.75 | b |
| 78.0 ~ 78.5 | 78.25 | c |
| 78.5 ~ 79.0 | 78.75 | d |
| 79.0 ~ 79.5 | 79.25 | e |
| 79.5 ~ 80.0 | 79.75 | f |
| 80.0 ~ 80.5 | 80.25 | g |
| 80.5 ~ 81.0 | 80.75 | h |

FIG. 10

Temp. = 0°C ~ 20°C

| FREQUENCY BAND [GHz] | CENTER FREQUENCY [GHz] | INTENSITY OF RECEIVED SIGNAL [dB] |
|---|---|---|
| 77.0 ~ 77.5 | 77.25 | a1 |
| 77.5 ~ 78.0 | 77.75 | b1 |
| 78.0 ~ 78.5 | 78.25 | c1 |
| 78.5 ~ 79.0 | 78.75 | d1 |
| 79.0 ~ 79.5 | 79.25 | e1 |
| 79.5 ~ 80.0 | 79.75 | f1 |
| 80.0 ~ 80.5 | 80.25 | g1 |
| 80.5 ~ 81.0 | 80.75 | h1 |

FIG. 11

Temp. = 20°C~40°C

| FREQUENCY BAND [GHz] | CENTER FREQUENCY [GHz] | INTENSITY OF RECEIVED SIGNAL[dB] |
|---|---|---|
| 77.0 ~ 77.5 | 77.25 | a2 |
| 77.5 ~ 78.0 | 77.75 | b2 |
| 78.0 ~ 78.5 | 78.25 | c2 |
| 78.5 ~ 79.0 | 78.75 | d2 |
| 79.0 ~ 79.5 | 79.25 | e2 |
| 79.5 ~ 80.0 | 79.75 | f2 |
| 80.0 ~ 80.5 | 80.25 | g2 |
| 80.5 ~ 81.0 | 80.75 | h2 |

FIG. 12

| TEMPERATURE [°C] | OPTIMUM CENTER FREQUENCY [GHz] |
|---|---|
| 80°C~100°C | N7 |
| 60°C~80°C | N6 |
| 40°C~60°C | N5 |
| 20°C~40°C | N4=77.75 |
| 0°C~20°C | N3=79.75 |
| -20°C~0°C | N2 |
| -40°C~-20°C | N1 |

ELECTRONIC DEVICE, METHOD FOR CONTROLLING ELECTRONIC DEVICE, AND ELECTRONIC DEVICE CONTROL PROGRAM

CROSS REFERENCE TO RELATED APPLICATION

This application claims priority to Patent Application No. 2018-176513 filed in Japan on Sep. 20, 2018, and Patent Application 2018-179002, filed in Japan on Sep. 25, 2018, and the entire disclosure of these earlier applications are hereby incorporated for reference.

TECHNICAL FIELD

The present disclosure relates to an electronic device, a method for controlling electronic device, and an electronic device control program.

BACKGROUND

For example, in the field of industries related to automobiles, a technique for measuring distance between an own vehicle and an object is important. In particular, in recent years, RADAR (Radio Detecting and Ranging) technique for measuring distance between the own vehicle and the object by transmitting radio waves such as millimeter waves and receiving reflected waves obtained by reflection by the object such as an obstacle has been studied in various ways. The importance of technique for measuring such distances and the like is expected to grow more and more in the future with development of techniques that assist drivers in driving and related to automated driving that automates a part or all of driving.

Further, various techniques for detecting presence of an object by receiving reflected waves obtained by reflection of the transmitted radio waves by a predetermined object, have also been proposed. For example, PTL 1 discloses an FM-CW radar device emitting transmitted signals that is linearly FM modulated at a specific cycle toward a target object, detects a beat signal based on difference between the transmitted signals, and the received signals from the target object, and measures distance and speed based on frequency analysis of these signals.

CITATION LIST

Patent Literature

PTL 1: JPH11133144A

SUMMARY

An electronic device according to an embodiment comprises a transmitting antenna configured to transmit transmitted waves, a receiving antenna configured to receive reflected waves obtained by reflection of the transmitted waves, and a controller. The controller detects an object reflecting the transmitted waves based on transmitted signals transmitted as the transmitted waves and received signals received as the reflected waves. The controller determines frequencies of transmitted waves to be transmitted from the transmitting antenna based on temperature.

A method for controlling electronic device according to an embodiment includes the following steps.

(1) A step of transmitting transmitted waves from a transmitting antenna.

(2) A step of receiving reflected waves obtained by reflection of the transmitted waves from a receiving antenna.

(3) A step of detecting an object reflecting the transmitted waves based on transmitted signals transmitted as the transmitted waves and received signals received as the reflected waves.

(4) A step of determining frequencies of transmitted waves to be transmitted from the transmitting antenna based on temperature.

An electronic device control program according to an embodiment causes a computer to perform the steps (1) through (4) described above.

BRIEF DESCRIPTION OF THE DRAWINGS

In the accompanying drawings:

FIG. 7 is a diagram for showing an example of intensity of received signals detected for each frequency of transmitted waves in an embodiment.

FIG. 10 is a diagram for showing an example of intensity of a received signal detected for each of frequencies of transmitted waves in an embodiment.

FIG. 11 is a diagram for showing another example of intensity of a received signal detected for each of frequencies of transmitted waves in an embodiment.

FIG. 12 is a diagram for showing an example of association between temperature and frequency in an electronic device according to an embodiment.

DETAILED DESCRIPTION

It is desirable to improve performance of detection in a technique for detecting presence of a predetermined object by receiving reflected waves obtained by reflection of the transmitted waves by the predetermined object (object). An objective of the present disclosure is to provide an electronic device, a method for controlling an electronic device, and an electronic device control program that can improve the performance of detecting an object that have reflected the transmitted waves. According to an embodiment, it is possible to provide an electronic device, a method for controlling electronic device, and an electronic device control program that can improve the performance of detecting an object that have reflected transmitted waves. Hereinafter, an embodiment will be described in detail with reference to the drawings.

An electronic device according to an embodiment, for example, by being mounted on a vehicle such as an automobile (mobile body), can detect the predetermined object existing around the mobile body. For this reason, an electronic device according to an embodiment can transmit transmitted waves from a transmitting antenna installed on a mobile body to surroundings of the mobile body. An electronic device according to an embodiment can receive reflected waves obtained by reflection of the transmitted waves from the receiving antenna installed on the mobile body. At least one of the transmitting antenna and the receiving antenna may be provided, for example, in a radar sensor or the like installed in the mobile body.

Hereinafter, as a typical example, the configuration in which an electronic device according to an embodiment is mounted in an automobile, such as a passenger car as an example of a mobile body will be described. However, mobile bodies on which an electronic device according to an embodiment is mounted is not limited to the automobile. An electronic device according to an embodiment may be mounted on a variety of mobile bodies, such as buses, trucks, motorcycles, bicycles, ships, aircrafts and drones. Further, mobile bodies on which an electronic device according to an embodiment is mounted are not necessarily limited to mobile bodies that move by their own power. For example, a mobile body on which an electronic device according to an embodiment is mounted may be a trailer portion towed by a tractor.

First, an example of detecting a body by an electronic device according to an embodiment will be described.

Figure 1:
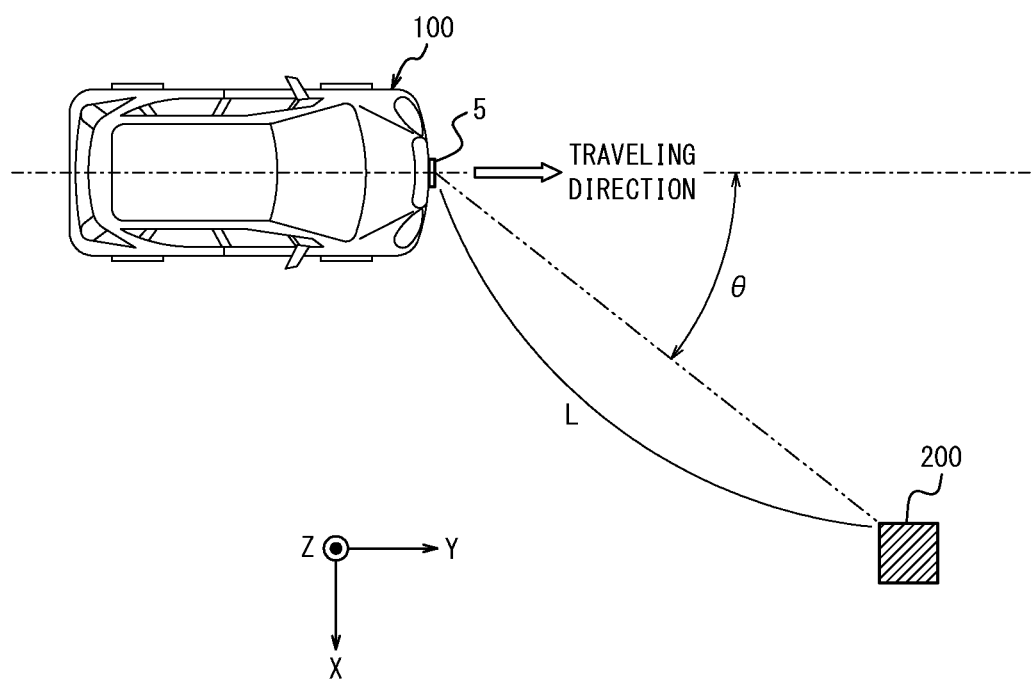
FIG. 1 is a diagram for explaining a use of an electronic device according to an embodiment.

FIG. 1 is a diagram for explaining a use of an electronic device according to an embodiment. FIG. 1 shows an example in which a sensor comprising a transmitting antenna and a receiving antenna according to an embodiment is installed on a mobile body.

In a mobile body 100 shown in FIG. 1, a sensor 5 comprising a transmitting antenna and a receiving antenna according to an embodiment is installed. Further, the mobile body 100 shown in FIG. 1 shall be equipped with an electronic device 1 according to an embodiment (for example, built-in). A specific configuration of the electronic device 1 will be described below. The sensor 5 may comprise, for example, at least one of the transmitting antenna and the receiving antenna. Further, the sensor 5 may include at least one of the other functional parts such as at least a part of a controller 10 included in the electronic device 1 (FIG. 2), as appropriate. The mobile body 100 shown in FIG. 1 may be an automobile vehicle, such as a passenger car, but may be an arbitrary type of mobile body. In FIG. 1, the mobile body 100, for example, may be moving (traveling or slow traveling) in the Y-axis positive direction (traveling direction) shown in FIG. 1, or may be moving in other directions, or may be stationary without moving.

As shown in FIG. 1, the sensor 5 comprising a plurality of transmitting antennas is installed on a mobile body 100. In the example shown in FIG. 1, only one sensor 5 comprising the transmitting antenna and the receiving antenna is installed in front of the mobile body 100. Here, a position where the sensor 5 is installed in the mobile body 100 is not limited to the position shown in FIG. 1, but may be other positions as appropriate. For example, the sensor 5 as shown in FIG. 1 may be installed on the left, right, and/or rear of the mobile body 100. Further, a number of such sensors 5 may be an arbitrary number of one or more, depending on various conditions (or requirements) such as the range and/or accuracy of the measurement in the mobile body 100.

The sensor 5 transmits electromagnetic waves as transmitted waves from a transmitting antenna. For example, if there is a predetermined object (for example, object 200 shown in FIG. 1) around the mobile body 100, at least a part of the transmitted waves transmitted from the sensor 5 is reflected by the object and becomes reflected waves. Then, by receiving such reflected waves by the receiving antenna of the sensor 5 for example, the electronic device 1 mounted on the mobile body 100 can detect the object.

The sensor 5 comprising a transmitting antenna may typically be a radar (RADAR(Radio Detecting and Ranging) sensor that transmits and receives radio waves. However, the sensor 5 is not limited to the radar sensor. The sensor 5 according to an embodiment may be a sensor based on a technique of, for example, LIDAR (Light Detection and Ranging, Laser Imaging Detection and Ranging) by light waves. Such sensors can be configured to include, for example, a patch antenna. Because techniques such as RADAR and LIDAR have been already known, detailed descriptions may be simplified or omitted as appropriate.

The electronic device 1 mounted on the mobile body 100 shown in FIG. 1 receives reflected waves obtained by reflection of the transmitted waves transmitted from a transmitting antenna of the sensor 5, from the receiving antenna. In this way, the electronic device 1 can detect a predetermined object 200 existing within a predetermined distance from the mobile body 100. For example, as shown in FIG. 1, the electronic device 1 can measure a distance L between the mobile body 100, which is its own vehicle, and the predetermined object 200. Further, the electronic device 1 can also measure relative speed between the mobile body 100, which is its own vehicle, and the predetermined object 200. Furthermore, the electronic device 1 can also measure an arrival direction (arrival angle $\theta$) in which reflected waves from the predetermined object 200 arrives at the mobile body 100, which is its own vehicle.

Here, the object 200 may be at least one of, for example, an oncoming vehicle traveling in a lane adjacent to the mobile body 100, a vehicle traveling in parallel with the mobile body 100, and a vehicle in front of or behind the mobile body 100 traveling in the same lane as the mobile body 100. The object 200 may be an arbitrary body existing around the mobile body 100, such as motorcycles, bicycles, strollers, pedestrians, guardrails, medians, road signs, sidewalk steps, walls, and obstacles. Furthermore, the object 200 may be moving or stopped. For example, the object 200 may be an automobile parked or stopped around the mobile body 100. In the present disclosure, objects detected by the sensor 5 include inanimate objects as well as organisms such as humans or animals. The objects detected by the sensors 5 according to the present disclosure include markers, in which humans, objects and animals are included, detected by radar technique.

In FIG. 1, a ratio of the size of the sensor 5 to the size of the mobile body 100 does not necessarily represent an actual ratio. Further, in FIG. 1, the sensor 5 shows a state of being installed outside the mobile body 100. However, in an embodiment, the sensor 5 may be installed in various positions on the mobile body 100. For example, in an embodiment, the sensor 5 may be installed inside the bumper of the mobile body 100 so that it does not appear in the outer appearance of the mobile body 100. Further, the position where the sensor 5 is installed on the mobile body 100 may be either outside or inside the mobile body 100. An inside the mobile body 100 may be, for example, an inside a body of the mobile body 100, an inside of bumpers, an inside of headlights, an inside of space of the vehicle or any combination of these.

Hereinafter, as a typical example, the transmitting antenna of the sensor 5 will be described as transmitting radio waves in a frequency band such as millimeter wave (above 30 GHz) or quasi-millimeter wave (for example, around 20 GHz to 30 GHz). For example, the transmitting antenna of the sensor 5 may transmit radio waves with a frequency bandwidth of 4 GHz, such as 77 GHz to 81 GHz.

Figure 2:
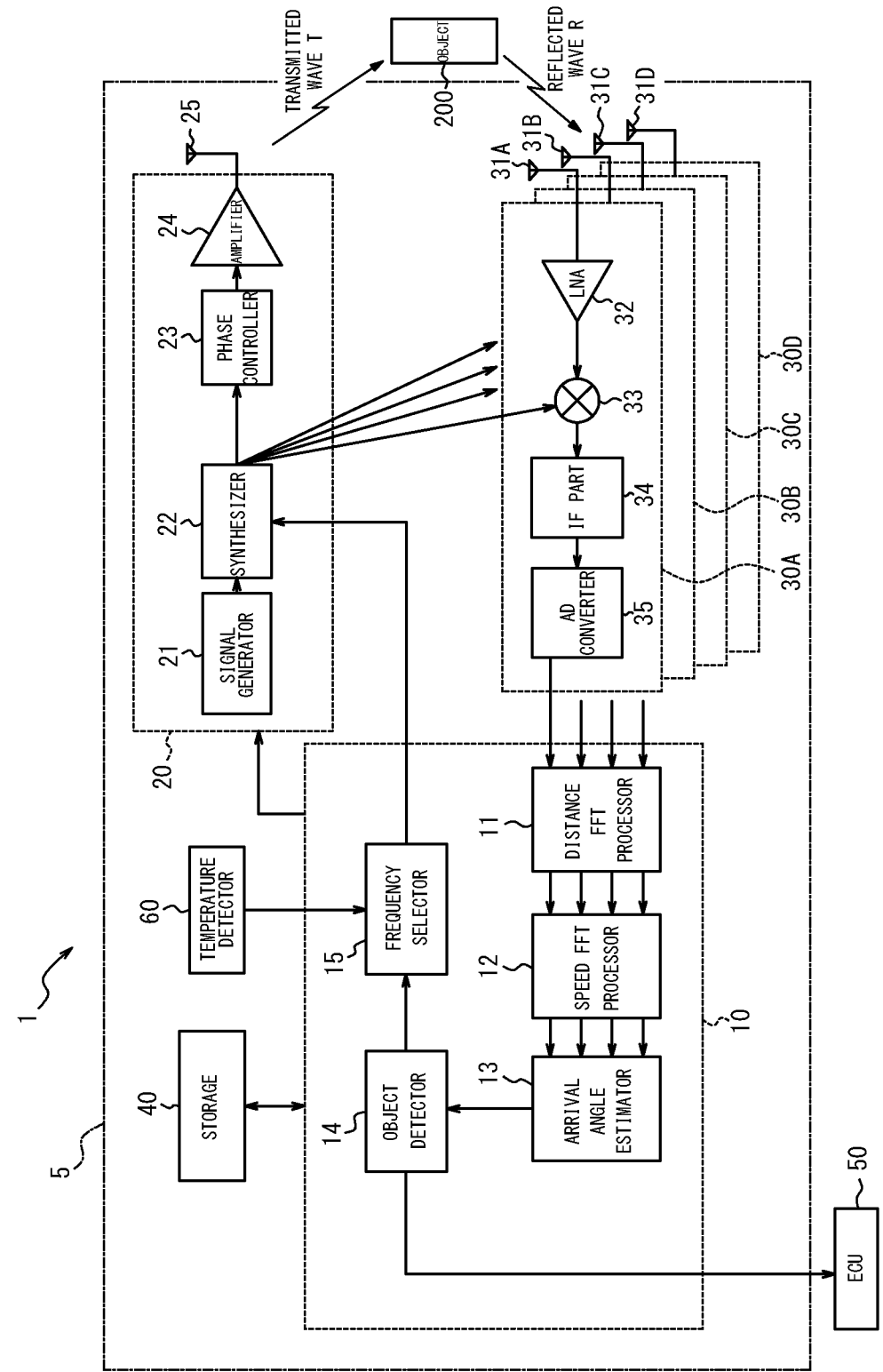
FIG. 2 is a functional block diagram schematically showing a configuration of an electronic device according to an embodiment.

FIG. 2 is a functional block diagram schematically showing an example of a configuration of the electronic device 1 according to an embodiment. Hereinafter, an example of a configuration of the electronic device 1 according to an embodiment will be described.

When measuring distance or the like by a millimeter wave radar, a frequency modulated continuous wave radar (hereafter referred to as FMCW radar (Frequency Modulated Continuous Wave radar)) is often used. The FMCW radar sweeps frequencies of radio waves to be transmitted, and thereby transmitted signals are generated. Therefore, for example, in a millimeter wave FMCW radar that uses radio waves in the 79 GHz frequency band, the frequency of the radio waves used will have a frequency bandwidth of 4 GHz, for example, such as 77 GHz to 81 GHz. A radar in the 79 GHz frequency band is characterized by a wider usable frequency bandwidth than other millimeter wave/quasi-millimeter wave radars, such as those in the 24 GHz, 60 GHz, and 76 GHz frequency bands. Hereinafter, such an embodiment will be described. Further, the FMCW radar used in the present disclosure may include the FCM (Fast-Chirp Modulation) radar, which transmits chirp signals with a shorter cycle than usual. The signals generated by a signal generator 21 are not limited to FM-CW signals. The signals generated by the signal generator 21 may be signals of various methods other than the FM-CW method. The transmitted signal sequence stored in a storage 40 may be different for these various methods. For example, in the case of FM-CW radar signals described above, signals whose frequency increases and decreases with each time sample may be used. Because known techniques can be appropriately applied to the various methods described above, more detailed description thereof will be omitted.

As shown in FIG. 2, an electronic device 1 according to an embodiment consists of the sensor 5 and an ECU (Electronic Control Unit) 50. The ECU 50 controls various operations of the mobile body 100. The ECU 50 may consist of at least one or more ECUs. The electronic device 1 according to an embodiment comprises the controller 10. Further, the electronic device 1 according to an embodiment may appropriately include other functional parts such as at least one of a transmitter 20, receivers 30A to 30D, and the storage 40. As shown in FIG. 2, the electronic device 1 may comprise a plurality of receivers, such as the receivers 30A to 30D. Hereinafter, when the receiver 30A, the receiver 30B, the receiver 30C, and the receiver 30D are not distinguished, they are simply referred to as "receiver 30".

The controller 10 may comprise a distance FFT processor 11, a speed FFT processor 12, an arrival angle estimator 13, an object detector 14 and a frequency selector 15. These functional parts included in the controller 10 will be further described below.

The transmitter 20, as shown in FIG. 2, may comprise a signal generator 21, a synthesizer 22, a phase controller 23, an amplifier 24, and a transmitting antenna 25.

The receiver 30 may comprise corresponding receiving antennas 31A to 31D, as shown in FIG. 2. Hereinafter, when the receiving antenna 31A, the receiving antenna 311B, the receiving antenna 31C and the receiving antenna 31D are not distinguished, they are simply referred to as "receiving antenna 31". Further, as shown in FIG. 2, a plurality of receivers 30 may respectively comprise a LNA 32, a mixer 33, an IF part 34, and an AD converter 35. The receivers 30A to 30D may have the same configuration, respectively. In FIG. 2, as a representative example, a configuration of only the receiver 30A is schematically shown.

The above-mentioned sensor 5 may comprise, for example, the transmitting antenna 25 and the receiving antenna 31. The sensor 5 may also include at least any one of the other functional parts, such as the controller 10, as appropriate.

The controller 10 comprised by the electronic device 1 according to an embodiment can control an operation of the entire electronic device 1 including an control of each functional part constituting the electronic device 1. The controller 10 may include at least one processor, such as a CPU (central processing unit), for example, in order to provide control and processing power for performing various functions. The controller 10 may be realized collectively by one processor, by several processors, or by individual processors. The processor may be realized as a single integrated circuit. An integrated circuit is also referred to as an IC (Integrated Circuit). A processor may be realized as a plurality of communicably connected integrated circuits and discrete circuits. A processor may be realized based on various other known techniques. In an embodiment, the controller 10 may be configured, for example, as a CPU and a program executed on the CPU. The controller 10 may appropriately include a memory necessary for an operation of the controller 10.

The storage 40 may store programs executed by the controller 10, results of process executed by the controller 10 and the like. Further, the storage 40 may function as a work memory for the controller 10. The storage 40 can be configured by, for example, a semiconductor memory, a magnetic disk or the like, but is not limited to these, and can be an arbitrary storage device. Further, for example, the storage 40 may be a storage medium such as a memory card that is inserted in the electronic device 1 according to the present embodiment. Further, the storage 40 may also be an internal memory of a CPU that is used as the controller 10, as described above.

In an embodiment, the storage 40 stores the correspondence between the frequency of the transmitted wave T to be transmitted from the transmitting antenna 25 and the temperature. Such correspondence will be described further below.

In the electronic device 1 according to an embodiment, the controller 10 can control at least one of the transmitter 20 and the receiver 30. In this case, the controller 10 may control at least one of the transmitter 20 and the receiver 30 based on various information stored in the storage 40. Further, in the electronic device 1 according to an embodiment, the controller 10 may instruct the signal generator 21 to generate signals, or may control the signal generator 21 to generate signals.

The signal generator 21 generates the signals (transmitted signals) to be transmitted as transmitted waves T from the transmitting antenna 25 under the control of the controller 10. The signal generator 21 may assign frequencies of transmitted signals, for example based on control by the controller 10 (frequency selector 15) when generating transmitted signals. For example, the signal generator 21 generates signals with predetermined frequencies in a frequency band, such as 77 GHz to 81 GHz, by receiving frequency information from the controller 10. The signal generator 21 may be configured to include a functional part such as a voltage controlled oscillator (VCO).

The signal generator 21 may be configured as a hardware including the function, for example, may be configured by a microcontroller and the like, or for example, may be configured as a combination of a processor such as a CPU and a program executed by the processor. Each functional part described below may also be configured as a hardware including the function, or if possible, for example, by a microcontroller and the like, or for example, as a combination of a processor such as a CPU and a program executed by the processor.

In the electronic device 1 according to an embodiment, the signal generator 21 may generate a transmitted signal (transmitted chirp signal) such as a chirp signal. In particular, the signal generator 21 may generate a signal (linear chirp signal) in which a frequency changes periodically and linearly. For example, the signal generator 21 may generate a chirp signal in which a frequency increases periodically and linearly from 77 GHz to 81 GHz with passage of time. Further, for example, the signal generator 21 may generate a signal in which a frequency periodically repeats linear increase (up chirp) and decrease (down chirp) from 77 GHz to 81 GHz with passage of time. The signal generated by the signal generator 21 may be preset in the controller 10, for example. Further, the signal generated by the signal generator 21 may be stored in advance in a storage 40 or the like, for example. Because chirp signals used in technical fields such as radar are known, more detailed description will be simplified or omitted as appropriate. The signal generated by the signal generator 21 is supplied to the synthesizer 22.

Figure 3:
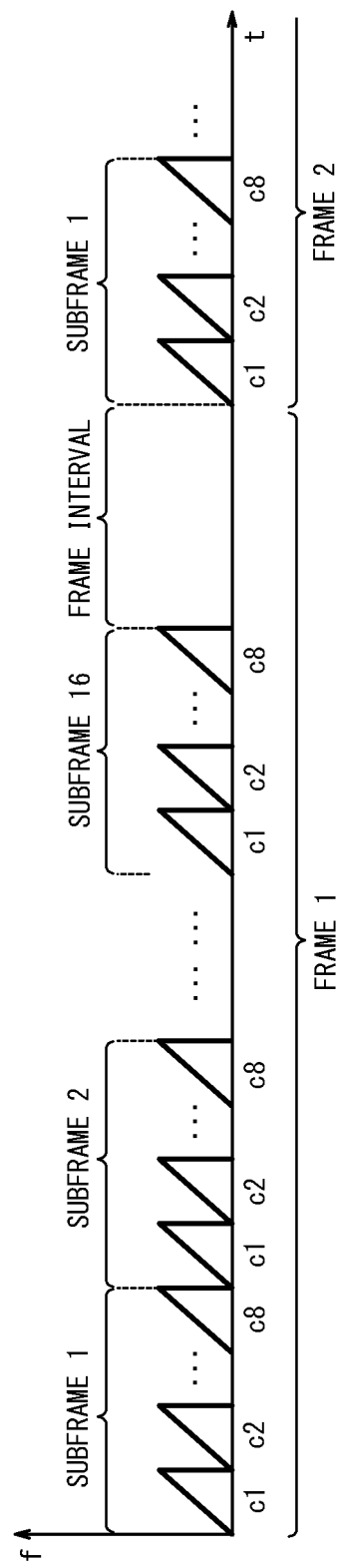
FIG. 3 is a diagram for explaining a configuration of transmitted signals according to an embodiment.

FIG. 3 is a diagram for explaining an example of a chirp signal generated by the signal generator 21.

In FIG. 3, the horizontal axis represents the passage of time, and the vertical axis represents the frequency. In the example shown in FIG. 3, the signal generator 21 generates a linear chirp signal in which a frequency changes periodically and linearly. In FIG. 3, each chirp signal is shown as $c1, c2, \ldots c8$. As shown in FIG. 3, in each chirp signal, a frequency increases linearly with passage of time.

In an example shown in FIG. 3, eight chirp signals such as $c1, c2, \ldots, C8$ are included to form one subframe. That is, the subframe 1 and the subframe 2 shown in FIG. 3 are configured to include eight chirp signals such as $c1, c2, \ldots, C8$, respectively. Further, in an example shown in FIG. 3, 16 subframes such as subframes 1 to 16 are included to form one frame. That is, one frame consists of 16 subframes respectively, such as frame 1 and frame 2 shown in FIG. 3. Further, as shown in FIG. 3, frame interval of predetermined length may be included between the frames.

In FIG. 3, frame 2 and beyond may have a similar configuration. Further, in FIG. 3, frame 3 and beyond may have a similar configuration. In the electronic device 1 according to an embodiment, the signal generator 21 may generate a transmitted signal as an arbitrary number of frames. Also, in FIG. 3, some chirp signals are shown omitted. Thus, a relationship between frequency and time of a transmitted signal generated by the signal generator 21 may be stored in the storage 40, for example.

Thus, the electronic device 1 according to an embodiment may transmit the transmitted signal consisting of subframes including a plurality of chirp signals. Also, the electronic device 1 according to an embodiment may transmit a transmitted signal consisting of a frame including a predetermined number of subframes.

Hereinafter, the electronic device 1 will be described as transmitting the frame structure transmitted signal as shown in FIG. 3. However, the frame structure as shown in FIG. 3 is an example, and a number of chirp signals included in one subframe is not limited to eight, for example. In an embodiment, the signal generator 21 may generate subframes including an arbitrary number of (for example, any plural) chirp signals. Further, the subframe structure as shown in FIG. 3 is also an example. For example, a number of subframes included in one frame is not limited to 16. In an embodiment, the signal generator 21 may generate a frame including an arbitrary number of (for example, any plural) subframes.

Returning to FIG. 2, the synthesizer 22 raises a frequency of the signal generated by the signal generator 21 to a frequency in a predetermined frequency band. The synthesizer 22 may raise a frequency of the signal generated by the signal generator 21 to a frequency selected as a frequency of the transmitted wave T that is transmitted from the transmitting antenna 25. The frequency to be selected as the frequency of the transmitted wave T to be transmitted from the transmitting antenna 25 may be set by the controller 10, for example. For example, the frequency to be selected as the frequency of the transmitted wave T to be transmitted from the transmitting antenna 25 may be the frequency selected by the frequency selector 15. Further, the frequency selected as the frequency of the transmitted wave T to be transmitted from the transmitting antenna 25 may be stored in the storage 40, for example. The signal whose frequency has been raised by the synthesizer 22 is supplied to the phase controller 23 and the mixer 33. When there are a plurality of receivers 30, the signal whose frequency has been raised by the synthesizer 22 may be supplied to each of the mixer 33 in the plurality of receivers 30.

The phase controller 23 controls a phase of a transmitted signal supplied by the synthesizer 22. Specifically, the phase controller 23 may adjust the phase of the transmitted signal by appropriately advancing or delaying the phase of the signal supplied from the synthesizer 22 based on control by the controller 10, for example. In this case, the phase controller 23 may adjust the phase of each transmitted signal based on path difference of each transmitted wave T to be transmitted from a plurality of transmitting antennas 25. By the phase controller 23 appropriately adjusting the phase of each transmitted signal, the transmitted waves T transmitted from the plurality of transmitting antennas 25 intensify each other in a predetermined direction to form a beam (beamforming). In this case, the correlation between the beamforming direction, and the phase amount to be controlled of the transmitted signals respectively transmitted by the plurality of transmitting antennas 25 may be stored in the storage 40, for example. The transmitted signal whose phase is controlled by the phase controller 23 is supplied to the amplifier 24.

The amplifier 24 amplifies the power (electric power) of the transmitted signal supplied from the phase controller 23, for example, based on control by the controller 10. Because the technique itself for amplifying the power of the transmitted signal is already known, a more detailed description will be omitted. The amplifier 24 is connected to the transmitting antenna 25.

The transmitting antenna 25 outputs (transmits) the transmitted signal amplified by the amplifier 24 as the transmitted wave T. Because the transmitting antenna 25 can be configured in the same manner as the transmitting antenna used for known radar technique, a more detailed description will be omitted.

In this way, the electronic device 1 according to an embodiment can comprise the transmitting antenna 25 and transmit the transmitted signal (for example, transmitted chirp signal) as the transmitted wave T from the transmitting antenna 25. Here, at least one of each functional part comprising the electronic device 1 may be housed in a single enclosure. Further, in this case, the single enclosure may be constructed so that it cannot be easily opened. For example, the transmitting antenna 25, the receiving antenna 31, the amplifier 24 are preferably housed in the single enclosure, and this enclosure is preferably constructed so that it cannot be easily opened. Further, here, when the sensor 5 is installed on the mobile body 100 such as an automobile, the transmitting antenna 25 may transmit the transmitted wave T to the outside the mobile body 100 through a cover member such as a radar cover. In this case, the radar cover may be made of a substance that allows electromagnetic waves to pass through, such as synthetic resin or rubber. This radar cover may be, for example, a housing of the sensor 5. By covering the transmitting antenna 25 with a member such as the radar cover, risks that the transmitting antenna 25 is damaged or malfunctions due to contact with external objects can be reduced. Further, the radar cover and the housing may also be referred to as a radome. The cover member such as the radar cover described above will be described below.

The electronic device 1 shown in FIG. 2 shows an example equipped with one transmitting antennas 25. However, the electronic device 1 according to an embodiment may comprise a plurality of transmitting antennas 25. In this case, the electronic device 1 may also comprise a plurality of phase controllers 23 and amplifiers 24, respectively, corresponding to a number of the plurality of transmitting antennas 25. The plurality of phase controllers 23 may then control the phase of the plurality of transmitted waves, supplied by the synthesizer 22 and transmitted from the plurality of transmitting antennas 25, respectively. Further, the plurality of amplifiers 24 may amplify the power of the plurality of transmitted signals, transmitted from the plurality of transmitting antennas 25, respectively. In this case, the sensor 5 may be configured to include the plurality of transmitting antennas Thus, when comprising the plurality of transmitting antennas 25, the electronic device 1 shown in FIG. 2 may also be configured to include the plurality of functional parts necessary for transmitting the transmitted wave T from the plurality of transmitting antennas 25, respectively.

The receiving antenna 31 receives the reflected wave R. The reflected wave R is the one obtained by reflection of the transmitted wave T on the predetermined object 200. The receiving antenna 31 may be configured to include a plurality of antennas, such as the receiving antenna 31A to the receiving antenna 31D. Because the receiving antenna 31 can be configured in the same manner as the receiving antenna used for the known radar technique, a more detailed description will be omitted. The receiving antenna 31 is connected to the LNA 32. The received signal based on the reflected wave R received by the receiving antenna 31 is supplied to the LNA 32.

The electronic device 1 according to an embodiment can receive the reflected wave R obtained by reflection of the transmitted wave T by a predetermined object 200, transmitted as the transmitted signal (transmitted chirp signal) such as a chirp signal, from a plurality of the receiving antennas 31. Thus, when the transmitted chirp signal is transmitted as the transmitted wave T, the received signal based on the received reflected wave R is referred to as a received chirp signal. That is, the electronic device 1 receives the received signal (for example, the received chirp signal) as the reflected wave R from the receiving antenna 31. Here, when the sensor 5 is installed on the mobile body 100 such as an automobile, the receiving antenna 31 may receive the reflected wave R from outside the mobile body 100 through the cover member such as the radar cover. In this case, the radar cover may be made of a substance that allows electromagnetic waves to pass through, such as synthetic resin or rubber. This radar cover may be, for example, a housing of the sensor 5. By covering the receiving antenna 31 with a member such as the radar cover, risks that the receiving antenna 31 is damaged or malfunctions due to contact with external objects can be reduced. Further, the radar cover described above and the housing may also be referred to as a radome.

Further, when the receiving antenna 31 is installed near the transmitting antenna 25, these may be collectively configured to be included in one sensor 5. That is, one sensor 5 may include, for example, at least one transmitting antenna 25 and at least one receiving antenna 31. For example, one sensor 5 may include a plurality of transmitting antennas 25 and a plurality of receiving antennas 31. In such a case, for example, one radar sensor may be covered with a cover member such as one radar cover.

The LNA 32 amplifies the received signal with low noise based on the reflected wave R received by the receiving antenna 31. The LNA 32 may be used as a low noise amplifier (Low Noise Amplifier), and amplifies the received signal supplied from the receiving antenna 31 with low noise. The received signal amplified by the LNA 32 is supplied to the mixer 33.

The mixer 33 generates the beat signal by mixing (multiplying) the RF frequency received signal supplied from the LNA 32 with the transmitted signal supplied from the synthesizer 22. The beat signal mixed by the mixer 33 is supplied to the IF part 34.

The IF part 34 decreases the frequency of the beat signal to an intermediate frequency (IF (Intermediate Frequency) frequency) by performing frequency conversion on the beat signal supplied from the mixer 33. The beat signal whose frequency is decreased by the IF part 34 is supplied to the AD converter 35.

The AD converter 35 digitizes the analog beat signal supplied from the IF part 34. The AD converter 35 may be configured by any analog-to-digital conversion circuit (Analog to Digital Converter (ADC)). The beat signal digitized by the AD converter 35 is supplied to the distance FFT processor 11 of the controller 10. When there are a plurality of receivers 30, each beat signal digitized by the plurality of AD converters 35 may be supplied to the distance FFT processor 11.

The distance FFT processor 11 estimates the distance between the object 200 and the mobile body 100 equipped with the electronic device 1, based on the beat signal supplied from the AD converter 35. The distance FFT processor 11 may include, for example, a processor that performs Fast Fourier transform. In this case, the distance FFT processor 11 may consist of an arbitrary circuit or a chip that performs the Fast Fourier Transform (Fast Fourier Transform (FFT)) process. The distance FFT processor 11 may perform Fourier transforms other than the Fast Fourier transform.

The distance FFT processor 11 performs FFT process on the beat signal digitized by the AD converter 35 (hereinafter, appropriately referred to as "distance FFT process"). For example, the distance FFT processor 11 may perform the FFT process on the complex signal supplied from the AD converter 35. The beat signal digitized by the AD converter 35 can be represented as a time change of signal intensity (electric power). The distance FFT processor 11 performs FFT process on such beat signal, whereby it can be expressed as the signal intensity (electric power) corresponding to each frequency. When the peak is equal to or higher than a predetermined threshold value in the result obtained by performing the distance FFT process, the distance FFT processor 11 may determine that the predetermined object 200 exists at a distance corresponding to the peak. For example, such as the Constant False Alarm Rate (CFAR) detection process, when a peak value above a threshold value is detected in the average power or amplitude of the disturbance signal, a method to determine that there is an object (reflecting object) reflecting the transmitted wave is known.

Thus, the electronic device 1 according to an embodiment can detect the object 200 reflecting the transmitted wave T based on the transmitted signal transmitted as the transmitted wave T and the received signal received as the reflected wave R.

The distance FFT processor 11 can estimate the distance to the predetermined object based on one chirp signal (for example, c1 shown in FIG. 3). That is, the electronic device 1 can measure (estimate) the distance L shown in FIG. 1 by performing the distance FFT process. Because the technique itself for measuring (estimating) the distance to the predetermined object by performing FFT process on the beat signal is known, a more detailed description will be simplified or omitted as appropriate. Results of the distance FFT process performed by the distance FFT processor 11 (for example, distance information) may be supplied to the speed FFT processor 12. Further, results of the distance FFT process performed by the distance FFT processor 11 may be supplied to the object detector 14.

The speed FFT processor 12 estimates relative speed between the mobile body 100 equipped with the electronic device 1 and the object 200 based on the beat signal on which the distance FFT process has been performed by the distance FFT processor 11. The speed FFT processor 12 may include, for example, a processor for performing the Fast Fourier transform. In this case, the speed FFT processor 12 may consist of an arbitrary circuit or a chip, configured to perform the Fast Fourier Transform (Fast Fourier Transform (FFT)) process. The speed FFT processor 12 may perform Fourier transforms other than the Fast Fourier transform.

The speed FFT processor 12 further performs the FFT process on the beat signal on which the distance FFT process has been performed by the distance FFT processor 11 (hereinafter, appropriately referred to as "speed FFT process"). For example, the speed FFT processor 12 may perform FFT process on the complex signal supplied from the distance FFT processor 11. The speed FFT processor 12 can estimate relative speed with a predetermined object based on the subframe of the chirp signal (for example, the subframe 1 shown in FIG. 3). When the distance FFT process is performed on the beat signal as described above, a plurality of vectors can be generated. Relative speed with a predetermined object can be estimated by obtaining the phase of the peak in the result obtained by performing the speed FFT process on these plurality of vectors. That is, the electronic device 1 can measure (estimate) relative speed between the mobile body 100 shown in FIG. 1 and the predetermined object 200 by performing the speed FFT process. Because the technique itself for measuring (estimating) the relative speed with the predetermined object by performing the speed FFT process on the result of performing the distance FFT process is known, more detailed explanations are simplified or omitted as appropriate. The result of performing the speed FFT process by the speed FFT processor 12 (for example, speed information) may be supplied to the arrival angle estimator 13. Further, the result obtained by performing the speed FFT process by the speed FFT processor 12 may also be supplied to the object detector 14.

The arrival angle estimator 13 estimates the direction in which the reflected wave R arrives from the predetermined object 200 based on the result obtained by the speed FFT process performed by the speed FFT processor 12. The electronic device 1 can estimate the direction in which the reflected wave R arrives by receiving the reflected wave R from the plurality of receiving antennas 31. For example, the plurality of receiving antennas 31 shall be arranged at predetermined intervals. In this case, the transmitted wave T transmitted from the transmitting antenna 25 is reflected by the predetermined object 200 to become the reflected wave R, and each of the plurality of receiving antennas 31 arranged at predetermined intervals respectively receives the reflected wave R. Then, the arrival angle estimator 13 can estimate the direction in which the reflected wave R arrives at the receiving antenna 31 based on the phase of the reflected wave R respectively received by each of the plurality of receiving antennas 31 and the path difference of each reflected wave R. That is, the electronic device 1 can measure (estimate) the arrival angle θ shown in FIG. 1 based on the result obtained by performing the speed FFT process.

Various techniques for estimating the direction in which the reflected wave R arrives based on the result obtained by performing the speed FFT process have been proposed. For example, known algorithms for estimating the direction in which the reflected wave arrives include MUSIC (Multiple Signal Classification), ESPRIT (Estimation of Signal Parameters via Rotational Invariance Technique) and the like. Therefore, more detailed description of known techniques will be simplified or omitted as appropriate. The information of the arrival angle θ (angle information) estimated by the arrival angle estimator 13 may be supplied to the object detector 14.

The object detector 14 detects objects existing in the range in which the transmitted wave T is transmitted, based on information supplied from at least one of the distance FFT processor 11, the speed FFT processor 12, and the arrival angle estimator 13. The object detector 14 may perform object detection by performing a clustering process, for example, based on the supplied distance information, speed information, and angle information. As an algorithm used for clustering data, for example, DBSCAN (Density-based spatial clustering of applications with noise) is known. In the clustering process, for example, the average power of the points constituting the detected object may be calculated. The distance information, the speed information, the angle information, and the electric power information of the object detected by the object detector 14 may be supplied to the frequency selector 15. Further, the distance information, the speed information, the angle information, and the electric power information of the object detected by the object detector 14 may be supplied to the ECU 50. In this case, when the mobile body 100 is an automobile, communication may be performed using a communication interface such as CAN (Controller Area Network).

The frequency selector 15 selects the frequency of the transmitted wave T to be transmitted from the transmitting antenna 25 of the electronic device 1 based on the information supplied from the object detector 14. As described below, the frequency selector 15 may divide a band that can be used as a frequency band for transmitting the transmitted wave T into several bands, and select a plurality of frequencies for transmitting the transmitted wave T from the bands. Further, as described below, the frequency selector 15 may select the frequency that maximizes the signal intensity (for example, electric power) of the signal received as each of reflected waves R obtained by reflection of the transmitted waves T with the plurality of frequencies, transmitted as described above. The frequency selector 15 may set the frequency selected as described above in the synthesizer 22. Thereby, the synthesizer 22 can raise the frequency of the signal generated by the signal generator 21 to the frequency selected by the frequency selector 15. Further, the frequency selector 15 may start an operation of selecting a frequency based on the temperature information detected by the temperature detector 60 described below.

In an embodiment, the frequency selector 15 may select the frequency of the transmitted wave T to be transmitted from the transmitting antenna 25, for example, based on the temperature detected by the temperature detector 60. In this case, as described below, the temperature detector 60 may detect, for example, the temperature at the cover member covering the transmitting antenna 25 and/or the receiving antenna. Further, as described below, when performing an operation of associating the temperature with the optimum frequency, the frequency selector 15 may sequentially select a plurality of frequencies by changing the frequency of the transmitted wave T to be transmitted from the transmitting antenna 25. Also, when performing the operation of associating the temperature with the optimum frequency, the frequency selector 15 may select a frequency that maximizes the signal intensity (for example, electric power) of the signal received as each of reflected waves R obtained by reflection of the transmitted waves T transmitted with a plurality of frequencies. Then, when performing the operation of detecting the predetermined object 200, the frequency selector 15 may set the frequency selected as described above in the synthesizer 22.

The ECU 50 equipped with the electronic device 1 according to an embodiment can control an operation of the entire mobile body 100, including control of each functional part comprising the mobile body 100. The ECU 50 may include at least one processor, such as a CPU (Central Processing Unit), for example, in order to provide control and processing power for performing various functions. The ECU 50 may be realized collectively by one processor, by several processors, or by individual processors. The processor may be realized as a single integrated circuit. An integrated circuit is also referred to as an IC (Integrated Circuit). A processor may be realized as a plurality of communicably connected integrated circuits and discrete circuits. A processor may be realized based on various other known techniques. In an embodiment, the ECU 50 may be configured, for example, as a CPU and a program executed on the CPU. ECU 50 may appropriately include the memory necessary for an operation of the ECU 50. Further, at least a part of a function of the controller 10 may be a function of the ECU 50, or at least a part of a function of the ECU 50 may be a function of the controller 10.

The temperature detector 60 can detect the temperature of a predetermined portion of the electronic device 1, for example. The temperature detector 60 may be any temperature sensor, such as a sensor that employs a resistance temperature detector or a thermocouple as long as it can detect the temperature. Specific examples of the portion where the temperature detector 60 detects the temperature will be described below. The temperature information detected by the temperature detector 60 may be supplied to the controller 10. Further, the temperature information detected by the temperature detector 60 may be supplied to the frequency selector 15 of the controller 10, for example. As described above, for example, when performing an operation of detecting a predetermined object 200, the frequency selector 15 may select the frequency based on the temperature information detected by the temperature detector 60.

The electronic device 1 shown in FIG. 2 comprises one transmitting antennas 25 and four receiving antennas 31. However, the electronic device 1 according to an embodiment may comprise a plurality of transmitting antennas 25. For example, by comprising two transmitting antennas 25 and four receiving antennas 31, the electronic device 1 can be considered to comprise a virtual antenna array consisting of eight virtual antennas. In this way, the electronic device 1 may receive the reflected wave R of the 16 subframes shown in FIG. 3 by using, for example, eight virtual antennas.

Next, the operation of the electronic device 1 according to an embodiment will be described.

As described above, the electronic device 1 according to an embodiment detects the object 200 reflecting the transmitted wave T based on the transmitted signal transmitted as the transmitted wave T and the received signal received as the reflected wave R In this case, if at least a part of at least one of the transmitted wave T and the reflected wave R is covered by a cover member, for example, made of resin, this can affect at least one of the transmission of the transmitted wave T and the reception of the reflected wave R. When the sensor 5 constituting the electronic device 1 is mounted on a mobile body 100 such as an automobile, the transmitting antenna 25 and the receiving antenna 31 may be protected by covering them with a cover member such as a radar cover. Further, from a design point of view, when the sensor 5 is mounted on the mobile body 100, the transmitting antenna 25 and the receiving antenna 31 may not be exposed but covered with the cover member such as the radar cover.

Hereinafter, the sensor 5 constituting the electronic device 1 according to an embodiment will be described as assuming that at least a part of the sensor 5 is covered with the cover member. If the sensor 5 is covered with the cover member, at least one of the transmitted wave T transmitted from the transmitting antenna 25 and the reflected wave R received from the receiving antenna 31 is attenuated when passing through the cover member, and loss may occur.

Figure 4:
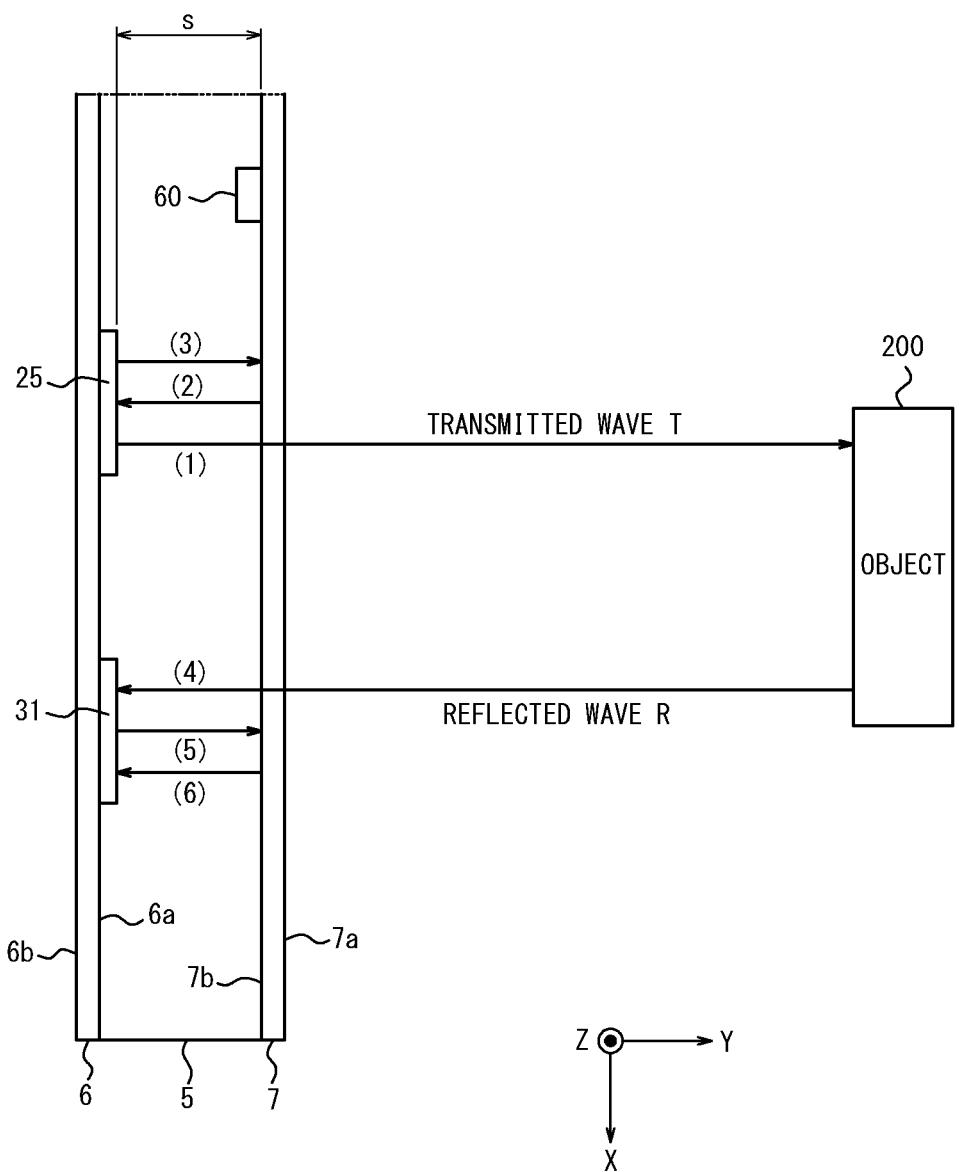
FIG. 4 is a functional block diagram schematically showing a configuration of a sensor according to an embodiment.

FIG. 4 is a diagram schematically showing the configuration of the sensor 5 constituting the electronic device 1 according to an embodiment. As well as FIG. 1, FIG. 4 shows the state of the sensor 5 viewed from above. Further, FIG. 4 schematically shows the positional relationship between the sensor 5 and the object 200.

As shown in FIG. 4, the sensor 5 comprises the transmitting antenna 25 and the receiving antenna 31 described above. Further, the sensor 5 comprises a sensor board 6 and a cover member 7. The sensor board 6 has a sensor board front surface 6a and a sensor board rear surface 6b. Further, the cover member 7 has a cover member front surface 7a and a cover member rear surface 7b. The cover member 7 is not necessarily limited to a member such as a radar cover or a radome, but may be a member that constitutes at least part of the mobile body 100, for example.

As shown in FIG. 4, in the sensor 5, the transmitting antenna 25 and receiving antenna 31 are arranged on the sensor board 6. In particular, in the sensor board 6, the transmitting antenna 25 and the receiving antenna 31 are arranged on the sensor board front surface 6a In FIG. 4, the transmitting antenna 25 and the receiving antenna 31 are shown as planarly configured antennas such as a patch antenna. Further, in the sensor 5, the cover member 7 is arranged to cover the transmitting antenna 25 and the receiving antenna 31. In particular, the cover member 7 is arranged so as to be separated from the transmitting antenna 25 and the receiving antenna 31 by a predetermined distance s. The cover member 7 may be made of a material such as synthetic resin or rubber. The cover member 7 may be made of a substance that allows electromagnetic waves to pass through.

As described above, in an embodiment, the cover member 7 may cover at least a part of at least one of the transmitting antenna 25 and the receiving antenna 31. Further, at least a part of the cover member 7 may be made of resin.

The applicant has confirmed that when the transmitted signal is transmitted as the transmitted wave T in the configuration shown in FIG. 4, the intensity (electric power) of the received signal received as the reflected wave R fluctuates depending on the wavelength A. of the transmitted wave T. Further, in the configuration shown in FIG. 4, the applicant has confirmed that the intensity (electric power) of the received signal, which is received as the reflected wave R, also fluctuates depending on the distance s from the transmitting antenna 25 and the receiving antenna 31 to the cover member 7.

Figure 5:
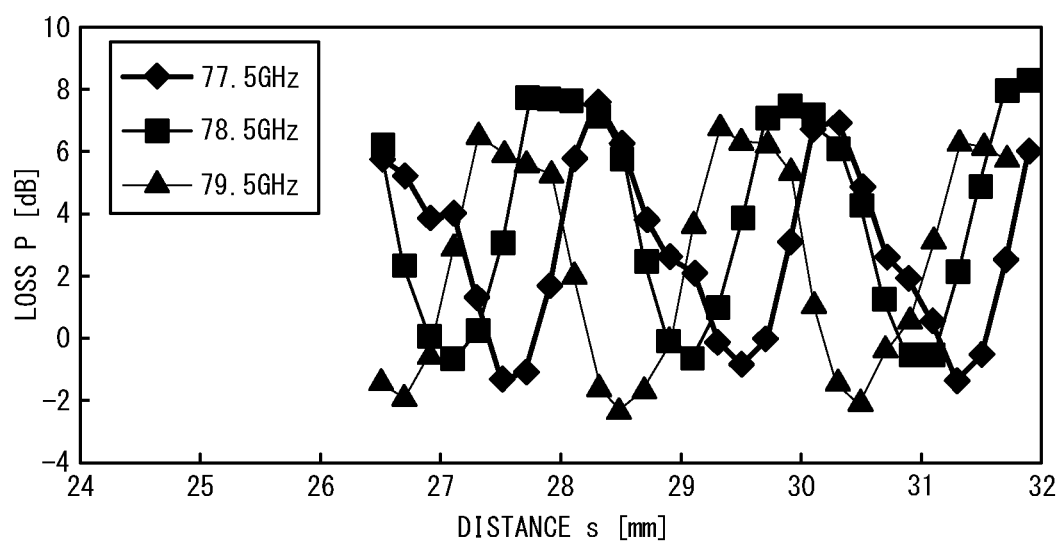
FIG. 5 is a diagram for showing loss of received signals in a conventional sensor.

FIG. 5 is a diagram showing a correlation between the distance s from the transmitting antenna 25 and the receiving antenna 31 to the cover member 7 and the loss P of the intensity of the received signal received as the reflected wave R. In FIG. 5, the horizontal axis represents the distance s (see FIG. 4) from the transmitting antenna 25 and receiving antenna 31 to the cover member 7. The vertical axis represents the loss P of the intensity of the received signal received as the reflected wave R. As shown in FIG. 5, when the distance s is gradually increased, for example, the loss P of the intensity of the received signal repeats increasing and decreasing accordingly. That is, depending on the arrangement of the transmitting antenna 25, the receiving antenna 31, and the cover member 7, the loss of the received signal caused by the resin or the like constituting the cover member 7 becomes large. As the loss of the received signal increases, the distance at which the object 200 can be detected becomes shorter. Further, as shown in FIG. 5, such a change also differs depending on the frequency of the transmitted wave T.

It is conceivable that the fluctuation of the loss P in the intensity of the received signal as described above is caused by the fact that the transmitted wave T and the received wave R are transmitted and received through the cover member 7 in the configuration shown in FIG. 4.

As shown in FIG. 4, a part of the transmitted wave T transmitted from the transmitting antenna 25 passes through the cover member 7 from the transmitting antenna 25 and directly reaches the object 200, as shown in (1). On the other hand, as shown in FIG. 4, a part of the transmitted wave T transmitted from the transmitting antenna 25 is reflected by the cover member 7 before returning to the transmitting antenna 25 or the sensor board 6, as shown in (3) followed by (2) Then, a part of the transmitted wave T that returns to the transmitting antenna 25 or the sensor board 6, as shown in (2), passes through the cover member 7 from the transmitting antenna 25 to reach the object 200, as shown in (1). It is assumed that there is also a transmitted wave T that further repeats such reflection. Therefore, it is assumed that the transmitted wave T that reaches the object 200 is a composite of the transmitted wave T described above.

Further, as shown in FIG. 4, a part of the reflected wave R reflected by the object 200 passes through the cover member 7 and directly reaches the receiving antenna 31 as shown in (4). On the other hand, as shown in FIG. 4, a part of the reflected wave R that has passed through the cover member 7 and reached the receiving antenna 31 bounces back at the receiving antenna 31 or sensor board 6 and returns to the cover member 7, as shown in (4) followed by (5). Then, a part of the reflected wave R that has returned to the cover member 7 as shown in (5) is reflected by the cover member 7 and then reaches the receiving antenna 31 as shown in (6). Further, it is assumed that there is also a reflected wave R that further repeats such reflection. Therefore, the reflected wave R received by the receiving antenna 31 is assumed to be a composite of the reflected waves R described above.

Here, the transmittance at which the transmitted wave T and the reflected wave R pass through the cover member 7 and the reflectance at which the transmitted wave T and the reflected wave R are reflected by the cover member 7 depend on the material of the cover member 7. Further, it is assumed that the cover member 7 expands or contracts depending on the temperature That is, the thickness of the cover member 7 changes depending on the temperature. Further, the transmittance of the transmitted wave T and the reflected wave R passed through the cover member 7 and the reflectance of the transmitted wave T and the reflected wave R reflected by the cover member 7 also depend on the temperature of the cover member 7. Therefore, the loss of the intensity of the received signal received by the receiving antenna 31 as the reflected wave R obtained by the reflection of the transmitted wave T transmitted by the transmitting antenna 25 depends on the temperature of the cover member 7.

In an embodiment, the sensor 5 may comprise a temperature detector 60. The temperature detector 60 may be installed on the cover member 7 as shown in FIG. 4. Here, the temperature detector 60 may be installed on either the cover member front surface 7a or the cover member rear surface 7b. Further, the temperature detector 60 may be installed on both the cover member front surface 7a and the cover member rear surface 7b. In this case, among the temperatures detected by the plurality of temperature detectors 60, the lowest temperature may be used, the highest temperature may be used, or the average temperature may be used. Further, the temperature detector 60 may be installed on the sensor board front surface 6a and % or the sensor board rear surface 6b. Further, the temperature detector 60 may be installed anywhere inside the sensor 5 to detect the temperature inside the sensor 5, or it may be installed anywhere outside the sensor 5 to detect the ambient temperature. In the present disclosure, the number of temperature detectors 60 may be any number of 1 or more.

With the above configuration, the electronic device 1 operates so that the loss of the received signal is reduced even if the characteristics of the cover member 7 change with temperature.

Hereinafter, the operation of the electronic device 1 according to an embodiment will be described.

The electronic device 1 according to an embodiment transmits a transmitted wave T at different frequencies, and detects an object using the frequency at which the intensity (electric power) of the received signal, received as a reflected wave R obtained by reflection of the transmitted wave T, becomes the strongest.

Figure 6:
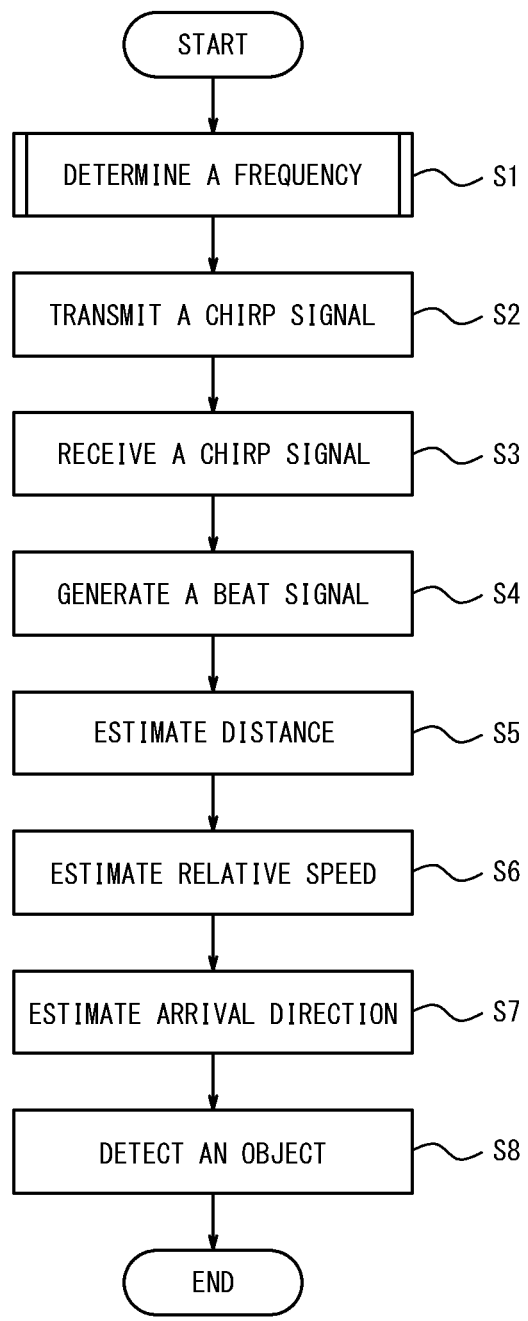
FIG. 6 is a flowchart for explaining an operation of an electronic device according to an embodiment.
Figure 8:
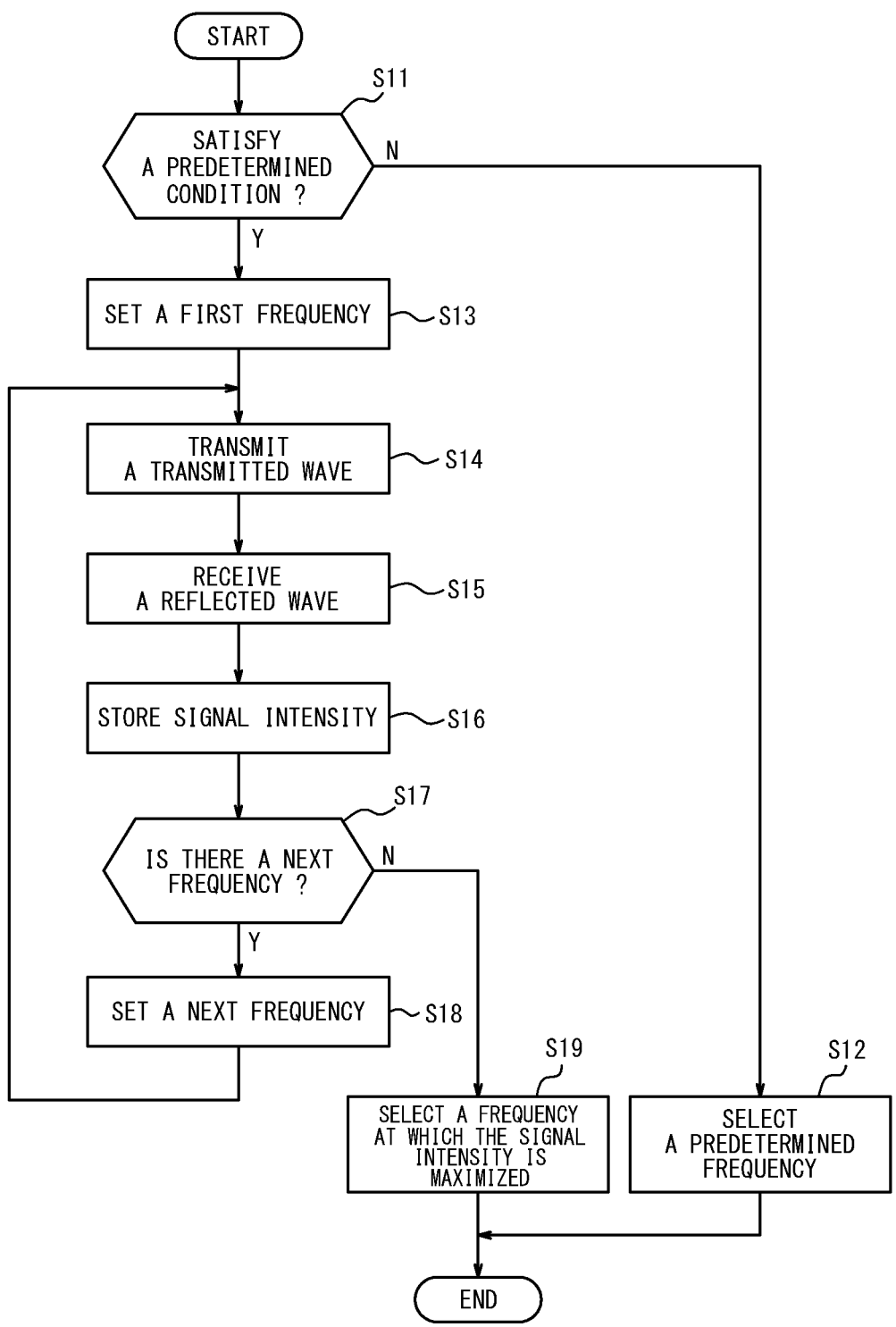
FIG. 8 is a flowchart for explaining an operation of an electronic device according to an embodiment.

FIG. 6 through 8 are diagrams to illustrate examples of the operation of the electronic device 1 according to an embodiment Hereinafter, an example of the operation of the electronic device 1 according to an embodiment will be described. Hereinafter, the electronic device 1 will be described as being configured as a millimeter wave FMCW radar.

FIG. 6 is a flowchart explaining the operation of the electronic device 1 according to an embodiment. The operation shown in FIG. 6 may be started, for example, when the electronic device 1 detects a predetermined object 200 existing around the mobile body 100.

When the operation shown in FIG. 6 starts, the controller 10 of the electronic device 1 firstly determines the frequency of the transmitted wave T transmitted from the transmitting antenna 25 (step S1).

In an embodiment, the electronic device 1 transmits a plurality of transmitted waves T at different frequencies. Therefore, before determining the frequency of the transmitted wave T transmitted from the transmitting antenna in step S1, the controller 10 prepares a plurality of different frequencies from the frequency band of the transmitted wave T transmitted from the transmitting antenna 25. For example, as shown in FIG. 7, when the frequency band of the transmitted wave T is from 77 GHz to 81 GHz, the controller 10 may divide this frequency band into eight sections of 0.5 GHz each.

FIG. 7 shows an example in which the frequency band of the transmitted wave T (77 GHz to 81 GHz) is divided into eight sections, and the center frequency is set in each of the divided eight frequency bands. For example, a center frequency of 77.25 GHz is set in the frequency band of 77.0 GHz to 77.5 GHz. Further, for example, a center frequency of 77.75 GHz is set in the frequency band of 77.5 GHz to 78.0 GHz. Further, for example, a center frequency of 78.25 GHz is set in the frequency band of 78.0 GHz to 78.5 GHz.

In the example shown in FIG. 7, the frequency band from 77 GHz to 81 GHz is divided into eight sections. However, in an embodiment, a frequency band of any range may be divided into any plurality of bands. For example, in the present disclosure, the frequency band of 77 GHz to 81 GHz may be divided by any number of frequency bands. For example, in the present disclosure, the frequency band of 77 GHz to 81 GHz may be divided by two frequency bands or by ten frequency bands. Further, each frequency band may be at least two equal frequency bands.

In the example shown in FIG. 7, each of the frequency bands of the transmitted wave T (77 GHz to 81 GHz) is consecutively divided without overlap. However, in an embodiment, each of the bands obtained by dividing the frequency range of the transmitted wave T may contain overlaps, as long as a plurality of transmitted waves T can be transmitted at different frequencies. For example, when dividing the frequency band (77 to 81 GHz) of the transmitted wave T, each of the bands may be 77.0 to 78.0 GHz (center frequency 77.5 GHz), 77.5 to 78.5 GHz (center frequency 78.0 GHz), 78.0 to 79.0 GHz (center frequency 78.5 GHz) . . . . . Further, in an embodiment, each of the bands obtained by dividing the frequency band of the transmitted wave T may contain discontinuous portions. For example, when dividing the frequency band (77 to 81 GHz) of the transmitted wave T, each of the bands may be 77.0 to 77.5 GHz (center frequency 77.25 GHz), 78.0 to 78.5 GHz (center frequency 78.25 GHz), 79.0 to 79.5 GHz (center frequency 79.25 GHz) . . . . . In the following explanation, as shown in the example in FIG. 7, the frequency band of 77 GHz to 81 GHz is divided equally into eight sections, and each of the divided eight frequency bands is assumed to be continuous.

In step S1 shown in FIG. 6, the controller 10 determines the frequency of the transmitted wave T transmitted from the transmitting antenna 25 from any one of the frequency bands (corresponding to the center frequency) divided as shown in FIG. 7.

FIG. 8 is a flowchart showing the operation of determining the frequency performed in step S1 shown in FIG. 6 in more detail. Hereinafter, the operation of determining the frequency in step S1 will be described in more detail.

When the operation of step S1 shown in FIG. 6 starts, as shown in FIG. 8, the controller 10 determines whether the electronic device 1 satisfies a predetermined condition (step S11). Various conditions can be assumed as the predetermined conditions in the electronic device 1 to be determined in step S11. In an embodiment, the predetermined condition may be, for example, a condition for the temperature detected by the temperature detector 60.

As an example, the controller 10 may define the normal temperature range of the mobile body 100 on which the electronic device 1 is mounted, such as 10° C. to 28° C. In this case, if the temperature detector 60 detects a temperature outside the range of 10° C. to 28° C., the controller 10 may determine that the predetermined condition is satisfied. Further, as an example, the controller 10 defines a predetermined temperature change (temperature change rate) detected by the temperature detector 60 in a unit time, and when the temperature change rate becomes equal to or higher than a predetermined value, the controller 10 may determine that the predetermined condition is satisfied. That is, in this case, when the temperature detector 60 detects a certain temperature change, it is determined that the predetermined condition is satisfied. As described above, the temperature detector 60 may be installed at an arbitrary location inside the sensor 5 to detect the temperature inside the sensor 5, or may be installed at an arbitrary location outside the sensor 5 to detect the ambient temperature.

The temperature detector 60 may also be used to detect the temperature of the cover member 7 at the sensor 5, as shown in FIG. 4. Therefore, as another example, the controller 10 may define the normal temperature range of the cover member 7 as 15° C. to 25° C. In this case, if the temperature detector 60 detects that the temperature of the cover member 7 is outside the range of 15' C to 25° C., the controller 10 may determine that the predetermined condition is satisfied. Further, as another example, the controller 10 defines a predetermined temperature change (temperature change rate) in a unit time of the cover member 7, and when the temperature change rate of the cover member 7 becomes equal to or higher than a predetermined value, it may be determined that the predetermined condition is satisfied. That is, in this case, when a certain degree of temperature change is detected by the temperature detector 60 at the cover member 7, it is determined that the predetermined condition is satisfied.

Thus, for example, when the temperature detector 60 detects a temperature outside the predetermined range at the cover member 7 or in the vicinity of the cover member 7, the controller 10 may determine that the predetermined condition is satisfied. When the temperature detector 60 detects a predetermined temperature change at the cover member 7 or in the vicinity of the cover member 7, the controller 10 may determine that the predetermined conditions is satisfied. In the present disclosure, the controller 10 may determine that a predetermined condition is satisfied based on the detected temperature detected by the temperature detector 60.

If it is determined in step S11 that the predetermined condition is not satisfied, the controller 10 selects a predetermined frequency (step S12) and terminates the operation shown in FIG. 8. Here, the predetermined frequency in step S12 may be, for example, the frequency specified by default, or the frequency used in the previous operation may be used this time as well. That is, in step S12, the frequency may be determined without performing the operation shown in FIG. 8. As described above, in an embodiment, when the predetermined condition is not satisfied in step S11, the controller 10 may select a predetermined frequency such as the default frequency or the frequency used in the previous operation.

On the other hand, when it is determined in step S11 that the predetermined condition is satisfied, the controller 10 sets the first frequency among the frequencies prepared as the frequencies of the transmitted wave T (step S13). More specifically, in step S13, the frequency selector 15 notifies the synthesizer 22 of the first frequency among the plurality of different frequencies as shown as the center frequency in FIG. 7. This allows the synthesizer 22 to set the frequency of the signal generated by the signal generator 21 to the frequency notified by the frequency selector 15. Here, the first frequency may be, for example, the lowest frequency 77.25 GHz shown in the uppermost stage among the plurality of different frequencies as shown as the center frequency in FIG. 7.

After the frequency has been set in step S13, the electronic device 1 transmits the transmitted wave T at the set frequency from the transmitting antenna 25 (step S14). As described above, when the transmitted wave T is transmitted from the transmitting antenna 25 and a predetermined object 200 or the like exists around the mobile body 100, the transmitted wave T is reflected and becomes a reflected wave R.

When the transmitted wave T is transmitted in step S14, the electronic device 1 receives the reflected wave R from the receiving antenna 31 (step S15). When the reflected wave R is received in step S15, the controller 10 stores the signal intensity (for example, electric power) of the received signal received as the reflected wave R in the storage 40 (step S16), for example. For example, it is assumed that the transmitted wave T with a frequency of 77.25 GHz is transmitted in step S14 and the intensity (electric power) of the received signal received as the reflected wave R in step S15 is a [dB] as shown in FIG. 7. In this case, in step S16, the controller 10 stores the signal intensity a [dB] in the storage 40 or the like corresponding to the frequency 77.25 GHz.

After the signal intensity has been stored in step S16, the controller 10 determines whether a next frequency for transmitting the transmitted wave T exists (step S17). If the next frequency exists in step S17, the controller 1) sets the next frequency (step S18). For example, in step S12, it is assumed that the controller 10 sets the center frequency 77.25 GHz shown in FIG. 7 as the first frequency. In this case, the controller 10 determines in step S17 that 77.75 GHz exists as the next frequency, and sets the frequency of 77.75 GHz in step S18.

After the frequency is set in step S18, the controller 10 transmits the transmitted wave T in step S14 using that frequency as well as after step S13, and receives the reflected wave R in step S15. For example, it is assumed that the transmitted wave T with a frequency of 77.75 GHz is transmitted in step S14 and the intensity (electric power) of the received signal received as the reflected wave R in step S15 is b [dB] as shown in FIG. 7. In this case, in step S16, the controller 10 stores the signal intensity b [dB] in the storage 40 or the like corresponding to the frequency 77.75 GHz. Then, the controller 10 determines in step S17 that the center frequency 78.25 GHz shown in FIG. 7 exists as the next frequency, and sets 78.25 GHz as the frequency for transmitting the transmitted wave T in step S18.

In the same way thereafter, the controller 10 repeats step S14 to step S18 shown in FIG. 8 as long as the rest of the center frequency shown in FIG. 7 exists. Then, it is assumed that the controller 10 sets 80.75 GHz shown in FIG. 7 as the frequency for transmitting the transmitted wave T in step S18. In this case, the controller 10 transmits the transmitted wave T in step S14, receives the reflected wave R in step S15, stores the signal intensity in step S16, and then determines that there is no next frequency in step S17.

If it is determined in step S17 that there is no next frequency, the table shown in FIG. 7 will be stored in the storage 40. That is, when proceeding to NO in step S17, as shown in FIG. 7, the values of the signal intensities a to h [dB] corresponding to the respective frequencies at the center frequency of 77.25 to 80.75 GHz are stored, respectively.

When proceeding to NO in step S17, the controller 10 selects the frequency at which the signal intensity (electric power) is maximized (step S19). For example, it is assumed that the value e [dB] is the maximum value among the values of the signal intensities a to h [dB] shown in FIG. 7. In this case, the controller 10 selects the frequency 78.75 GHz corresponding to the value e [dB] in step S19. When the frequency is selected in step S19, the controller 10 terminates the operation shown in FIG. 8 and determines the selected frequency as the frequency for transmitting the transmitted wave T.

In the above description, the controller 10 sets the lowest frequency (77.25 GHz) as the first frequency among the center frequencies shown in FIG. 7, and the frequency to be set next is gradually increased. However, in an embodiment, the frequency may be set in other ways. For example, the controller 10 may set the maximum frequency (80.75 GHz) as the first frequency among the center frequencies shown in FIG. 7, and the frequency to be set next may be gradually reduced. Further, the frequency to be selected as the first frequency does not have to be the maximum or the minimum among the prepared frequency band. Further, the frequency to be set next does not have to be changed to gradually increase or decrease.

Thus, in the electronic device 1 according to an embodiment, the controller 10 receives from the receiving antenna 31 each reflected wave R obtained by reflection of a plurality of transmitted waves T with different frequencies transmitted from the transmitting antenna 25. Then, the controller 10 determines the frequency of the transmitted wave T to be transmitted from the transmitting antenna 25 based on the results received from the receiving antenna 31.

Here, the controller 10 may sequentially transmit a plurality of transmitted waves from the transmitting antenna 25, and receive each of the reflected waves obtained by reflection of the plurality of transmitted waves from the receiving antenna 31. Further, the controller 10 may determine the frequency of the transmitted wave transmitted from the transmitting antenna 25 based on the intensity of the received signal received as each of reflected waves obtained by reflection of the plurality of transmitted waves. More specifically, the controller 10 may determine the frequency of the transmitted wave with the highest intensity of the received signal received as the reflected wave among the plurality of transmitted waves to be the frequency of the transmitted wave to be transmitted from the transmitting antenna 25.

As described above, in an embodiment, the controller 10 may start an operation of determining the frequency of the transmitted wave T when a predetermined condition is satisfied. In an embodiment, the controller 10 may start the operation of determining the frequency of the transmitted wave T when the electronic device 1 is started or activated. Further, in an embodiment, when the controller 10 detects a temperature out of the predetermined range, the controller 10 may start an operation of determining the frequency of the transmitted wave T. Further, in an embodiment, when detecting a predetermined temperature change, the controller 10 may start an operation of determining the frequency of the transmitted wave T.

Further, in an embodiment, when detecting a temperature out of the predetermined range at the cover member 7 or in the vicinity of the cover member 7, the controller 10 may start an operation of determining the frequency of the transmitted wave T. Further, in an embodiment, when detecting a predetermined temperature change at the cover member 7 or in the vicinity of the cover member 7, the controller 10 may start an operation of determining the frequency of the transmitted wave T.

Returning to FIG. 6, when the frequency of the transmitted wave T is determined in step S1, the controller 10 controls the transmitting antenna 25 of the transmitter 20 to transmit the chirp signal as the transmitted wave T with the determined frequency (Step S2). Specifically, the controller 10 instructs the signal generator 21 to generate a transmitted signal (chirp signal). The controller 10 then controls the chirp signal to be transmitted as a transmitted wave T from the transmitting antenna 25 through the synthesizer 22, the phase controller 23, and the amplifier 24. Here, the frequency selector 15 of the controller 10 notifies the synthesizer 22 of the frequency determined in step S1. Then, the synthesizer 22 raises the frequency of the signal generated by the signal generator 21 to the frequency notified by the frequency selector 15.

When a transmitted signal is transmitted as a transmitted wave T in step S2, for example, when a predetermined object 200 exists around the mobile body 100, the transmitted wave T is reflected by the object 200 and becomes a reflected wave R.

When the chirp signal is transmitted in step S2, the controller 10 controls the receiving antenna 31 of the receiver 30 to receive the chirp signal as the reflected wave R (step S3). When the chirp signal is received in step S3, the controller 10 controls the receiver 30 to generate a beat signal by multiplying the transmitted chirp signal and the received chirp signal (step S4). Specifically, the controller 10 controls the chirp signal received from the receiving antenna 31 to be amplified by the LNA 32 and multiplied with the transmitted chirp signal by the mixer 33. The process from step S1 to step S3 may be performed, for example, by employing a known millimeter wave FMCW radar technique.

When the beat signal is generated in step S4, the controller 10 estimates the distance L to the predetermined object 200 based on each generated chirp signal (step S5).

In step S5, the distance FFT processor 11 performs distance FFT process on the beat signal generated in step S4. When the distance FFT process is performed in step S5, the signal intensity (electric power) corresponding to each frequency is obtained. In step S5, the distance FFT processor 11 may perform distance FFT process on the digital beat signal supplied from the AD converter 35. In step S5, the distance FFT processor 11 may estimate the distance to the predetermined object 200 based on determining whether among the generated beat signal, the peak in the result obtained by performing the distance FFT process is equal to or higher than a predetermined threshold value. Further, the beat signal on which the distance FFT process is performed in step S5 may be a unit of one chirp signal (for example, c1 shown in FIG. 3), for example.

After the distance is estimated in step S5, the controller 10 estimates the relative speed with the object 200 (step S6).

In step S6, the speed FFT processor 12 performs speed FFT process on the result on which the distance FFT process has been performed in step S5. In step S6, the speed FFT processor 12 may perform the speed FFT process on the result on which the distance FFT process has been performed by the distance FFT processor 11. In step S6, the speed FFT processor 12 may estimate the relative speed with the predetermined object 200 based on determining whether the peak in the result obtained by performing the speed FFT process is equal to or higher than a predetermined threshold value. The signal on which the speed FFT process is performed in step S6 may be a unit of chirp signals (for example, c1 to c8 shown in FIG. 3) included in one subframe, for example.

After the distance is estimated in step S6, the controller 10 estimates the direction in which the reflected wave R arrives from the object 200 (step S7).

In step S7, the arrival angle estimator 13 may estimate the direction in which the reflected wave R arrives from the object 200 based on the result obtained by performing the speed FFT process in step S6. In step S7, the arrival angle estimator 13 may estimate the direction in which the reflected wave R arrives by using an algorithm such as MUSIC and ESPRIT as described above. The signal in which the arrival direction is estimated in step S7 may, for example, be a unit of all of the chirp signals in 16 subframes (subframe 1 to subframe 16 shown in FIG. 3) included in one frame (for example, frame 1 shown in FIG. 3).

When the arrival direction is estimated in step S7, the controller 10 detects the object 200 (step S8). In step S8, the object detector 14 may determine whether a predetermined object 200 exists based on at least one of the distance estimated in step S5, the relative speed estimated in step S6, and the arrival direction estimated in step 7. The electronic device 1 according to an embodiment may perform the operation shown in FIG. 6 for each frame, for example.

The radar sensors using conventional millimeter wave radar technique are expected to be unable to perform good measurements depending on the positional relationship with the transmitting antennas and/or the receiving antennas when the cover member such as the radar cover is made of resin, for example. For example, the transmitted signal and/or the received signal may pass through the cover member made of resin, which may cause a loss in the intensity of the received signal. If the loss of the intensity of the received signal becomes large, it is assumed that the distance that the radar sensor can detect a predetermined object becomes shorter. This is mainly due to the fact that the resin that makes up the cover member expands or contracts depending on the temperature, which changes the loss of intensity of the received signal when the transmitted signal and/or the received signal pass through the resin.

On the other hand, the electronic device 1 according to an embodiment measures the temperature at the cover member 7 or the ambient temperature, and the like, and operates to optimize the frequency of the transmitted wave T when the temperature is out of a predetermined range. In this case, the electronic device 1 divides the bands that can be used as the frequency of the transmitted wave T (see FIG. 7), and transmits the transmitted wave T at the frequency in each divided band. The electronic device 1 then determines the frequency at which the power intensity of the received signal received as the reflected wave R, obtained by reflection of the transmitted wave T, is maximized, to be the frequency of the transmitted wave T.

As a result, the electronic device 1 can determine the optimum frequency for the transmitted wave T even when the temperature at the cover member 7 or the ambient temperature changes to a considerable extent. In this way, because the electronic device 1 can minimize the loss of the intensity of the received signal caused by the resin constituting the cover member 7, the distance at which a predetermined object can be detected can be maximized.

Therefore, according to an embodiment of the electronic device 1, the performance of detecting objects reflecting the transmitted waves can be improved.

FIGS. 9 to 13 are diagrams for explaining another example of the operation of the electronic device 1 according to an embodiment Hereinafter, another example of the operation of the electronic device 1 according to an embodiment will be described. Hereinafter, as in the case described above, the electronic device 1 will be described as being configured as a millimeter wave type FMCW radar.

Firstly, in the electronic device 1 according to an embodiment, the operation of associating the temperature with the optimum frequency will be described. The electronic device 1 according to an embodiment, at a predetermined temperature, transmits the transmitted wave T at a different frequency, and associates, for example, a frequency (optimal frequency) at which the intensity (electric power) of the received signal received as the reflected wave R obtained by reflection of the transmitted wave T becomes the strongest, with the predetermined temperature.

Figure 9:
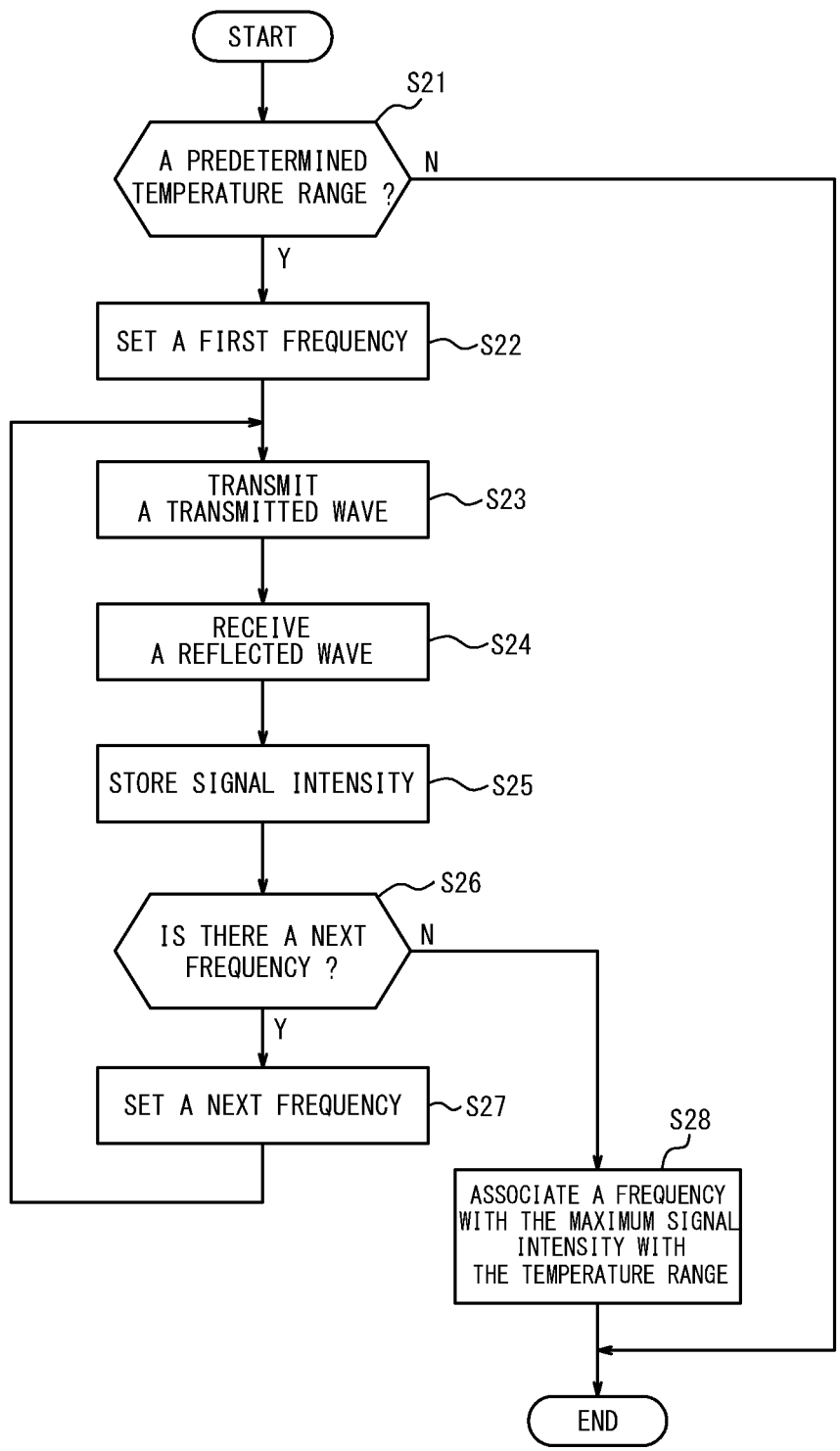
FIG. 9 is a flowchart for explaining an operation to associate temperature with frequency in an electronic device according to an embodiment.

FIG. 9 is a flowchart for showing an operation of associating the temperature with the optimum frequency (hereinafter, appropriately referred to as "association") in the electronic device 1 according to an embodiment. The association shown in FIG. 9 may be, for example, the operation to be performed at the time of factory shipment of the mobile body 100 equipped with the electronic device 1 (sensor 5). The association shown in FIG. 9 can also be used as a calibration, for example, to be performed as a test mode, in a mobile body 100 equipped with the electronic device 1 (sensor 5).

In the association shown in FIG. 9, the electronic device 1 is operated at a predetermined temperature at the cover member 7 or in the vicinity of the cover member 7. Therefore, when making this association, any temperature control mechanism, such as a heater and/or cooler, is used to allow the cover member 7 or the vicinity of the cover member 7 to reach a predetermined temperature, for example. Such a temperature control mechanism may be installed inside the sensor 5, for example, or may be installed outside the sensor 5 such as a temperature controllable test environment.

The association shown in FIG. 9 is performed for a predetermined temperature range. Further, in an embodiment, the predetermined temperature range may be a plurality of temperature ranges. Therefore, in this case, the association shown in FIG. 9 may be performed for each of the plurality of predetermined temperature ranges Here, various ranges can be assumed as the predetermined temperature range. For example, the predetermined temperature range may be in increments of 20° C. such as 0° C. to 20° C., 200° C. to 40° C., 40° C. to 60° C., and the like. Further, the predetermined temperature range may be in increments of 10° C., such as 0° C. to 10° C., 10° C. to 20° C. 20° C. to 30° C., and the like. Further, the predetermined temperature range may be in increments of 5° C. such as 0° C. to 5° C., 5° C. to 10° C., 10° C. to 15° C., and the like. Further, the predetermined temperature range may be in increments of 1° C., such as 0° C. to 1° C. 1° C. to 2° C., 2° C. to 3° C., and the like. As described above, the predetermined temperature range may be in any temperature increment, in any temperature range. In addition, in this disclosure, the description of A° C. to B° C. and the temperature range A to B [° C.] with A and B as arbitrary numbers shall mean A° C. or higher and lower than B° C.

Hereinafter, the predetermined temperature range will be described as, for an example, a temperature range of −40° C. to 100° C. in increments of 20° C. That is, in this case, the association shown in FIG. 9 may be performed (that is, multiple times) for each of the following temperature ranges: −40° C. to −20° C. −20° C. to 0° C., 0° C. to 20° C. 20° C. to 40° C., 40° C. to 60° C., 60° C. to 80° C., and 80° C. to 100° C.

As an example, firstly, the association performed for a predetermined temperature range of 0° C. to 20° C. will be described. When the operation shown in FIG. 9 starts, the controller 10 determines whether the temperature detected by the temperature detector 60 is within the predetermined temperature range of 0° C. to 20° C. (step S21). The temperature detected by the temperature detector 60 in step S21 may be the temperature at the cover member 7 or in the vicinity of the cover member 7. That is, in step S21, it is determined whether the temperature at the cover member 7 or in the vicinity of the cover member 7 is within 0° C. to 20° C.

If it is determined that the temperature is not within the predetermined range in step S21, the controller 10 terminates the operation shown in FIG. 9. When the operation shown in FIG. 9 is terminated in this way, the controller 10 may wait until the temperature detected by the temperature detector 60 reaches the predetermined temperature range by starting the operation shown in FIG. 9 again. For example, if the temperature detected by the temperature detector 60 is 23° C. when associating with the predetermined temperature range of 0° C. to 20° C. as described above, the cover member 7 or the vicinity of the cover member 7 may be cooled by using a temperature control mechanism such as a cooler. By doing so, it is assumed that over time the temperature detected by the temperature detector 60 will change to fall within a predetermined temperature range (0° C. to 20° C.) Further, for example, if the temperature detected by the temperature detector 60 is −5° C. when associating with the predetermined temperature range of 0° C. to 20° C. as described above, the cover member 7 or the vicinity of the cover member 7 may be heated using a temperature control mechanism such as a heater. By doing so, it is assumed that over time the temperature detected by the temperature detector 60 will change to fall within a predetermined temperature range (0° C. to 20° C.).

If the operation shown in FIG. 9 is terminated when it is determined that the temperature is not within the predetermined temperature range (NO) in step S21, the controller 10 may change the predetermined temperature range for the association. For example, if the temperature detected by the temperature detector 60 is 230° C. when associating with the predetermined temperature range of 0° C. to 20° C. as described above, the controller 10 may change the predetermined temperature range for the association to 20° C. to 40° C. By doing so, by starting the operation shown in FIG. 9 again, it is determined that the temperature detected by the temperature detector 60 is within the predetermined temperature range.

On the other hand, when it is determined in step S21 that the temperature is within the predetermined temperature range, the controller 10 sets the first frequency among the frequencies prepared for the frequency of the transmitted wave T (step S22).

Here, the frequency to be set when the electronic device 1 transmits the transmitted wave T will be described. In an embodiment, the electronic device 1 transmits a plurality of transmitted waves T at different frequencies. Therefore, before determining the frequency of the transmitted wave T to be transmitted from the transmitting antenna 25 in step S22, the controller 10 prepares a plurality of different frequencies from the frequency band of the transmitted wave T to be transmitted from the transmitting antenna 25. For example, when the frequency band of the transmitted wave T is from 77 GHz to 81 GHz, as shown in FIG. 10, the controller 10 may divide this frequency band into eight sections of 0.5 GHz each.

FIG. 10 shows an example in which the frequency band (77 GHz to 81 GHz) of the transmitted wave T is divided into eight sections, and the center frequency is set for each of the eight divided frequency bands. For example, a center frequency of 77.25 GHz is set for the frequency band of 77.0 GHz to 77.5 GHz. Further, for example, a center frequency of 77.75 GHz is set for the frequency band of 77.5 GHz to 78.0 GHz. Further, for example, a center frequency of 78.25 GHz is set for the frequency band of 78.0 GHz to 78.5 GHz. In addition, in this disclosure, the description of A° C. to B° C. and the temperature range A to B [° C.] with A and B as arbitrary numbers shall mean A° C. or higher and lower than B° C.

In the example shown in FIG. 10, the frequency band from 77 GHz to 81 GHz is divided into eight sections. However, in an embodiment, a frequency band of any range may be divided into any plurality of bands.

Further, in the example shown in FIG. 10, each of the bands obtained by dividing the frequency range of the transmitted wave T (77 GHz to 81 GHz) is consecutively divided without overlap. However, in an embodiment, each of the bands obtained by dividing the frequency range of the transmitted wave T may contain overlaps, as long as a plurality of transmitted waves T can be transmitted at different frequencies. For example, when dividing the frequency band (77 to 81 GHz) of the transmitted wave T, each of the bands may be 77.0 to 78.0 GHz (center frequency 77.5 GHz), 77.5 to 78.5 GHz (center frequency 78.0 GHz), 78.0 to 79.0 GHz (center frequency 78.5 GHz) . . . . . Further, in an embodiment, each of the bands obtained by dividing the frequency band of the transmitted wave T may contain discontinuous portions. For example, when dividing the frequency band (77 to 81 GHz) of the transmitted wave T, each of the bands may be 77.0 to 77.5 GHz (center frequency 77.25 GHz), 78.0 to 78.5 GHz (center frequency 78.25 GHz), 79.0 to 79.5 GHz (center frequency 79.25 GHz), . . . . In the following explanation, as shown in the example in FIG. 10, the frequency band of 77 GHz to 81 GHz is divided equally into eight sections, and each of the divided eight frequency bands is assumed to be continuous.

In step S22 shown in FIG. 9, the controller 10 sets the frequency of the transmitted wave T to be transmitted from the transmitting antenna 25 from any one of the frequency bands (corresponding to the center frequency) divided as shown in FIG. 10. More specifically, in step S22, the frequency selector 15 notifies the synthesizer 22 of the first frequency among the plurality of different frequencies as shown as the center frequency in FIG. 10. This allows the synthesizer 22 to set the frequency of the signal generated by the signal generator 21 to the frequency notified by the frequency selector 15. Here, the first frequency may be, for example, the lowest frequency 77.25 GHz shown in the uppermost stage among the plurality of different frequencies shown as the center frequency in FIG. 10.

After the frequency has been set in step S22, the electronic device 1 transmits the transmitted wave T at the set frequency from the transmitting antenna 25 (step S23). As described above, when the transmitted wave T is transmitted from the transmitting antenna 25 and a predetermined object 200 or the like exists around the mobile body 100, the transmitted wave T is reflected and becomes a reflected wave R.

When the transmitted wave T is transmitted in step S23, the electronic device 1 receives the reflected wave R from the receiving antenna 31 (step S24). When the reflected wave R is received in step S24, the controller 10 stores the signal intensity (for example, electric power) of the received signal received as the reflected wave R in the storage 40, for example (step S25). By the time of process in step S25, the controller 10 may detect the predetermined object 200 by performing the Fast Fourier Transform process on the beat signal generated by multiplying the transmitted signal and the received signal to calculate the distance, speed, angle, and electric power. The controller 10 may store the electric power calculated in this way in the storage 40. Such object detection will be further described below. For example, it is assumed that the transmitted wave T with a frequency of 77.25 GHz is transmitted in step S23 and the intensity (electric power) of the received signal received as the reflected wave R in step S24 is a1 [dB] as shown in FIG. 10. In this case, in step S25, the controller 10 stores the signal intensity a1 [dB] in the storage 40 or the like in association with the frequency 77.25 GHz.

After the signal intensity has been stored in step S25, the controller 10 determines whether a next frequency for transmitting the transmitted wave T exists (step S26). If the next frequency exists in step S26, the controller 10 sets the next frequency (step S27). For example, in step S22, it is assumed that the controller 10 sets the center frequency 77.25 GHz shown in FIG. 10 as the first frequency. In this case, the controller 10 determines in step S26 that 77.75 GHz exists as the next frequency, and sets the frequency of 77.75 GHz in step S27.

After the frequency is set in step S27, the controller 10 transmits the transmitted wave T in step S23 using that frequency as well as after step S22, and receives the reflected wave R in step S24. For example, it is assumed that the transmitted wave T with a frequency of 77.75 GHz is transmitted in step S23 and the intensity (electric power) of the received signal received as the reflected wave R in step S24 is b1 [dB] as shown in FIG. 10. In this case, in step S25, the controller 10 stores the signal intensity b1 [dB] in the storage 40 or the like corresponding to the frequency 77.75 GHz. Then, the controller 10 determines in step S26 that the center frequency 78.25 GHz shown in FIG. 10 exists as the next frequency, and sets 78.25 GHz as the frequency for transmitting the transmitted wave T in step S27.

In the same way thereafter, the controller 10 repeats step S23 to step S27 shown in FIG. 9 as long as the rest of the center frequency shown in FIG. 10 exists. Then, it is assumed that the controller 10 sets 80.75 GHz shown in FIG. 10 as the frequency for transmitting the transmitted wave T in step S27. In this case, the controller 10 transmits the transmitted wave T in step S23, receives the reflected wave R in step S24, stores the signal intensity in step S25, and then determines that there is no next frequency in step S26.

If it is determined in step S26 that there is no next frequency, the table shown in FIG. 10 will be stored in the storage 40. That is, when proceeding to NO in step S26, as shown in FIG. 10, the values of the signal intensities a1 to h1 [dB] corresponding to the respective frequencies at the center frequency of 77.25 to 80.75 GHz are stored for the temperature range 0° C. to 20° C., respectively.

When proceeding to NO in step S26, the controller 10 associates the frequency at which the signal intensity (electric power) is maximized with the predetermined temperature range described above (step S28) That is, in this example, the correspondence was performed with a predetermined temperature range of 0° C. to 20° C. For example, it is assumed that the value f1 [dB] is the maximum among the values of the signal intensities a1 to h1 [dB] shown in FIG. 10. In this case, in step S28, the controller 10 associates the frequency 79.75 GHz corresponding to the value f1 [dB] with the temperature range of 0° C. to 20° C. (stores in the storage 40). When the frequency is associated with the temperature in step S28, the controller 10 terminates the operation shown in FIG. 9. In this way, the electronic device 1 can perform the association for the temperature range of 0° C. to 20° C. In the above example, the electronic device 1 associates a frequency of 79.75 GHz as the optimum frequency with the temperature range of 0° C. to 20° C.

In the above description, the controller 10 sets the lowest frequency (77.25 GHz) as the first frequency among the center frequencies shown in FIG. 10, and the frequency to be set next is gradually increased. However, in an embodiment, the frequency may be set in other ways. For example, the controller 10 may set the maximum frequency (80.75 GHz) as the first frequency among the center frequencies shown in FIG. 10, and the frequency to be set next may be gradually reduced. Further, the frequency to be selected as the first frequency does not have to be the maximum or the minimum among the prepared frequency band. Further, the frequency to be set next does not have to be changed to gradually increase or decrease.

As described above, after the association shown in FIG. 9 is performed for the temperature range of 0° C. to 20° C., the controller 10 again performs the association shown in FIG. 9 for the next predetermined temperature range. Hereinafter, an example in which the association for the next predetermined temperature range of 20° C. to 40° C. is performed, following the temperature range of 0° C. to 20° C., will be shown.

FIG. 11 is a diagram for showing an example of the results of performing the association shown in FIG. 9 for the temperature range of 20° C. to 40° C. FIG. 11 is a diagram for showing the results of performing the association shown in FIG. 9 for the predetermined temperature range of 200° C. to 40° C. in the same manner as the results shown in FIG. 10. That is. FIG. 11 shows an example in which the values of the signal intensity a2 to h2 [dB] corresponding to the respective frequencies at the center frequency of 77.25 to 80.75 GHz are stored for the temperature range of 20° C. to 40° C., respectively. For example, it is assumed that the value b2 [dB] is the highest among the values of the signal intensities a2 to h2 [dB] shown in FIG. 11. In this case, in step S28 (FIG. 9), the controller 10 associates the frequency 77.75 GHz corresponding to the value b2 [dB] shown in FIG. 11 with the temperature range of 20° C. to 40° C. (stores in the storage 40). In this way, the electronic device 1 can perform the association for the temperature range of 20° C. to 40° C. In this example, the electronic device 1 associates a frequency of 77.75 GHz as an optimum frequency in the temperature range of 20° C. to 40° C. In addition, in this disclosure, the description of the signal intensity A [dB] to B [dB] with A and B as arbitrary numbers shall mean A [dB] or higher and lower than B [dB].

When the plurality of predetermined temperature ranges are respectively associated in this way, the electronic device 1 can, for example, store the correspondence in the storage 40, such as the table shown in FIG. 12.

FIG. 12 is a diagram for showing an example of the association between temperature and frequency in the electronic device 1. In the example described above, as shown in FIG. 12, f3=79.75 [dB] is associated with the temperature range 0 to 20 [° C.] as the optimum frequency. Further, in the example described above, as shown in FIG. 12, f4=77.75 [dB] is associated with the temperature range 20 to 40 [° C.] as the optimum frequency. Similarly, by performing the association shown in FIG. 9 for each of the temperature ranges of −40° C. to −20° C., −20° C. to 0° C. 40° C. to 60° C. 60° C. to 80° C., and 80° C. to 100° C. the information in the table shown in FIG. 12 can be added. The information in the table shown in FIG. 12 is filled, thereby the electronic device 1 can determine the frequency of the transmitted wave T to be transmitted from the transmitting antenna 25 in a predetermined temperature range.

Thus, in an embodiment, the frequency of the transmitted wave T to be transmitted from the transmitting antenna 25 may be associated with the predetermined temperature based on the result of receiving the reflected wave R obtained by reflection of the transmitted wave T transmitted from the transmitting antenna 25, from the receiving antenna 31 at the predetermined temperature. Here, in an embodiment, the frequency of the transmitted wave T to be transmitted from the transmitting antenna 25 may be associated with the predetermined temperature based on the multiple results of receiving each of the reflected waves R obtained by reflection of the plurality of transmitted waves T transmitted with different frequencies from the transmitting antenna 31, from the receiving antenna 25. Furthermore, in an embodiment, the frequency of the transmitted wave T to be transmitted from the transmitting antenna 25 may be associated with the predetermined temperature based on the intensity of the received signal received as each of the reflected waves R obtained by reflection of the plurality of transmitted waves T. More specifically, in an embodiment, the frequency of the transmitted wave with highest intensity of the received signal received as the reflected wave R among the plurality of transmitted waves T may be associated with a predetermined temperature as the frequency of the transmitted wave T to be transmitted from the transmitting antenna 25.

Next, in the electronic device 1 according to an embodiment, an operation of detecting a predetermined object based on the association shown in FIG. 9 will be described.

Figure 13:
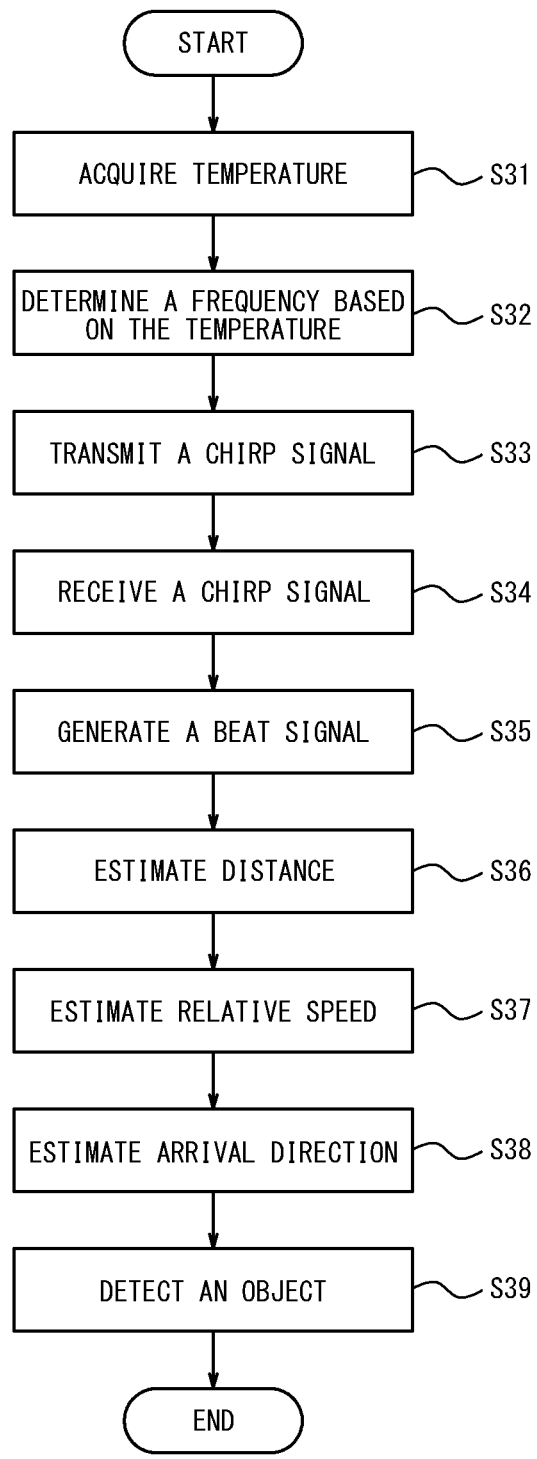
FIG. 13 is a flowchart for explaining operation of an electronic device according to an embodiment.

FIG. 13 is a flowchart for explaining an operation of detecting a predetermined object by the electronic device 1 according to an embodiment. The operation shown in FIG. 13 may be started on the assumption that the association shown in FIG. 9 has been made for at least some of the predetermined temperature ranges. Further, the operation shown in FIG. 13 may be started when the electronic device 1 detects the predetermined object 200 existing around the mobile object 100.

When the operation shown in FIG. 13 is started, the controller 10 of the electronic device 1 acquires the temperature detected by the temperature detector 60 (step S31).

In step S31, the temperature detector 60 may detect the temperature at the cover member 7 or in the vicinity of the cover member 7.

After acquiring the temperature in step S31, the controller 10 determines the frequency based on the acquired temperature (step S32). Specifically, in step S32, the frequency selector 15 of the controller 10 determines the frequency of the transmitted wave T to be transmitted from the transmitting antenna 25 based on the information stored in the storage 40. Here, the storage 40 stores the association between temperature and frequency as shown in FIG. 12, for example. Therefore, for example, if the temperature detected by the temperature detector 60 is 2° C., the frequency selector 15 selects the frequency f3=79.75 [GHz] corresponding to the temperature range 0 to 20 [° C.]. As a result, the frequency determined in step S32 becomes 79.75 [GHz]. Further, for example, if the temperature detected by the temperature detector 60 is 38° C. the frequency selector 15 selects the frequency f4=77.75 [GHz] corresponding to the temperature range of 20 to 40 [° C.]. As a result, the frequency determined in step S32 becomes 77.75 [GHz]. Similarly, for example, if the temperature detected by the temperature detector 60 is 51° C. the frequency selector 15 selects the frequency f5 [GHz] corresponding to the temperature range of 40 to 60 [° C.].

When the frequency of the transmitted wave T is determined in step S32, the controller 10 controls the transmitting antenna 25 of the transmitter 20 to transmit the chirp signal as the transmitted wave T with the determined frequency (Step S33) Specifically, the controller 10 instructs the signal generator 21 to generate the transmitted signal (chirp signal). The controller 10 then controls the chirp signal to be transmitted as a transmitted wave T from the transmitting antenna 25 through the synthesizer 22, the phase controller 23, and the amplifier 24. Here, the frequency selector 15 of the controller 10 notifies the synthesizer 22 of the frequency determined in step S32. Then, the synthesizer 32 raises the frequency of the signal generated by the signal generator 21 to the frequency notified by the frequency selector 15.

When the transmitted signal is transmitted as the transmitted wave T in step S33, for example, when the predetermined object 200 exists around the mobile body 100, the transmitted wave T is reflected by the object 200 and becomes the reflected wave R.

When the chirp signal is transmitted in step S33, the controller 10 controls the receiving antenna 31 of the receiver 30 to receive the chirp signal as the reflected wave R (step S34). When the chirp signal is received in step S34, the controller 10 controls the receiver 30 to generate a beat signal by multiplying the transmitted chirp signal and the received chirp signal (step S35). Specifically, the controller 10 controls the chirp signal received from the receiving antenna 31 to be amplified by the LNA 32 and multiplied with the transmitted chirp signal by the mixer 33. The process from step S33 to step S34 may be performed, for example, by employing a known millimeter wave FMCW radar technique.

When the beat signal is generated in step S35, the controller 10 estimates the distance L to the predetermined object 200 based on each generated chirp signal (step S36).

In step S36, the distance FFT processor 11 performs the distance FFT process on the beat signal generated in step S35. When the distance FFT process is performed in step S36, the signal intensity (electric power) corresponding to each frequency is obtained. In step S36, the distance FFT processor 11 may perform the distance FFT process on the digital beat signal supplied from the AD converter 35. In step S36, the distance FFT processor 11 may estimate the distance to the predetermined object 200 based on determining whether among the generated beat signal, the peak in the result obtained by performing the distance FFT process is equal to or higher than a predetermined threshold value. Further, the beat signal on which the distance FFT process is performed in step S36 may be a unit of one chirp signal (for example, c1 shown in FIG. 3), for example.

After the distance is estimated in step S36, the controller 10 estimates the relative speed with the object 200 (step S37).

In step S37, the speed FFT processor 12 performs the speed FFT process on the result on which the distance FFT process has been performed in step S36. In step S37, the speed FFT processor 12 may perform the speed FFT process on the result on which the distance FFT process has been performed by the distance FFT processor 11. In step S37, the speed FFT processor 12 may estimate the relative speed with the predetermined object 200 based on determining whether the peak in the result obtained by performing the speed FFT process is equal to or higher than a predetermined threshold value. The signal on which the speed FFT process is performed in step S37 may be a unit of chirp signals (for example, c1 to c8 shown in FIG. 3) included in one subframe, for example.

After the distance is estimated in step S37, the controller 10 estimates the direction in which the reflected wave R arrives from the object 200 (step S38).

In step S38, the arrival angle estimator 13 may estimate the direction in which the reflected wave R arrives from the object 200 based on the result obtained by performing the speed FFT process in step S37. In step S38, the arrival angle estimator 13 may estimate the direction in which the reflected wave R arrives by using an algorithm such as MUSIC and ESPRIT as described above. The signal in which the arrival direction is estimated in step S38 may, for example, be a unit of all of the chirp signals in 16 subframes (subframe 1 to subframe 16 shown in FIG. 3) included in one frame (for example, frame 1 shown in FIG. 3).

When the arrival direction is estimated in step S38, the controller 10 detects the object 200 (step S39). In step S39, the object detector 14 may determine whether the predetermined object 200 exists based on at least any one of the distance estimated in step S36, the relative speed estimated in step S37, and the arrival direction estimated in step 38. The electronic device 1 according to an embodiment may perform the operation shown in FIG. 13 for each frame, for example.

In this way, the controller 10 determines the frequency of the transmitted wave T to be transmitted from the transmitting antenna 25 based on, for example, the temperature detected by the temperature detector 60. Here, the temperature detector 60 may detect the temperature at the cover member 7 or in the vicinity of the cover member 7. That is, in an embodiment, the controller 10 may determine the frequency of the transmitted wave T to be transmitted from the transmitting antenna 25 based on the temperature at the cover member 7 or in the vicinity of the cover member 7. Further, in an embodiment, the controller 10 may instruct to store the correspondence between the temperature detected by the temperature detector 61) and the frequency of the transmitted wave T to be transmitted from the transmitting antenna 25. In this case, a storage 40 configured to store the correspondence between the temperature detected by the temperature detector 60 and the frequency of the transmitted wave T to be transmitted from the transmitting antenna 25 may be provided.

In an embodiment, the correspondence between the temperature detected by the temperature detector 60 and the frequency of the transmitted wave T to be transmitted from the transmitting antenna 25 does not have to be stored in the storage 40 or the like. In this case, for example, an arithmetic expression or the like that defines the correspondence between the temperature detected by the temperature detector 60 and the frequency of the transmitted wave T to be transmitted from the transmitting antenna 25 may be stored in the storage 40 or the like. In this way, in an embodiment, the controller 10 may calculate the frequency of the transmitted wave T to be transmitted from the transmitting antenna 25 based on the temperature detected by the temperature detector 60.

The radar sensors using conventional millimeter wave radar technique may not be able to perform good measurements depending on the positional relationship with the transmitting antennas and/or the receiving antennas when the cover member such as the radar cover is made of resin, for example. For example, the transmitted signal and/or the received signal passes through the cover member made of resin, which may cause a loss in the intensity of the received signal. It is assumed that the greater the loss of the intensity of the received signal, the shorter the distance that the radar sensor can detect the predetermined object. This is mainly due to the fact that the resin that makes up the cover member expands or contracts depending on the temperature, which changes the loss of the intensity of the received signal when the transmitted signal and/or the received signal pass through the resin.

On the other hand, the electronic device 1 according to an embodiment operates so as to detect the temperature at the cover member 7 or the ambient temperature and optimize the frequency of the transmitted wave T at that temperature.

Therefore, the electronic device 1 can determine the optimum frequency as the frequency of the transmitted wave T even when the temperature at the cover member 7 or the ambient temperature changes. In this way, the electronic device 1 can minimize the loss of the intensity of the received signal caused by the resin constituting the cover member 7, thus maximize the distance at which a predetermined object can be detected.

Therefore, according to an embodiment of the electronic device 1, the performance of detecting objects reflecting transmitted waves can be improved.

The present disclosure has been described based on the drawings and examples, but it should be noted that those skilled in the art will find it easy to make various variations or modifications based on the present disclosure. Therefore, it should be noted that these variations or modifications are included in the scope of this disclosure. For example, the functions included in each functional part and the like can be rearranged in a logically consistent manner. A plurality of functional parts and the like may be combined or divided into one Each of the embodiments according to the present disclosure described above is not limited to faithful implementation of each of the described embodiments, but may be implemented by combining or omitting some of the features as appropriate. That is, the contents of the present disclosure can be subjected to various variations and modifications based on the present disclosure by those skilled in the art. Therefore, these variations and modifications are included in the scope of this disclosure. For example, in each embodiment, each functional part, each means, each step and the like can be added to other embodiments in a logically consistent manner, or can be replaced with each functional part, each means, each step and the like of other embodiments. Further, in each embodiment, the plurality of each functional part, each means, each step and the like can be combined into one or divided. Each of the embodiments of the present disclosure described above is not limited to faithful implementation of each of the described embodiments, and may be implemented by combining or omitting some of the features as appropriate.

The embodiment described above is not limited to implementation only as an electronic device 1. For example, the embodiment described above may be implemented as a method for controlling devices such as the electronic device 1. Furthermore, for example, the embodiments described above may be implemented as a control program for devices such as the electronic device 1.

The electronic device 1 according to an embodiment may comprise at least a part of only one of the sensors 5 or the controller 10, for example, as a minimum configuration. On the other hand, in addition to the controller 10, the electronic device 1 according to an embodiment may be configured to include at least any one of the signal generator 21, synthesizer 22, phase controller 23, amplifier 24, and transmitting antenna 25, as shown in FIG. 3, as appropriate. The electronic device 1 according to an embodiment may also be configured to include at least any one of the receiving antenna 31, LNA 32, mixer 33, IF part 34, and AD converter 35, as appropriate, in place of or together with the functional parts described above. Furthermore, the electronic device 1 according to an embodiment may be configured to include a storage 40. Thus, the electronic device 1 according to an embodiment may be configured in various ways. When the electronic device 1 according to an embodiment is mounted on a mobile body 100, for example, at least any one of the functional parts described above may be installed in a suitable location, such as inside the mobile body 100. On the other hand, in an embodiment, for example, at least any one of the transmitting antenna 25 and the receiving antenna 31 may be installed outside the mobile body 100.

REFERENCE SIGNS LIST

1 Electronic device
5 Sensor
6 Sensor board
7 Cover member
10 Controller
11 Distance FFT processor
12 Speed FFT processor
13 Arrival angle estimator
14 Object detector
15 Frequency selector
20 Transmitter
21 Signal generator
22 Synthesizer
23 Phase controller
24 Amplifier
25 Transmitting antenna
30 Receiver
31 Receiving antenna
32 LNA
33 Mixer
34 IF part
35 AD converter
40 Storage
50 ECU
60 Temperature detector
100 Mobile body
200 Object (Body)

The invention claimed is:

1. An electronic device, comprising:
a transmitting antenna configured to sequentially transmit a plurality of transmitted waves;
a receiving antenna configured to receive reflected waves obtained by reflection of the plurality of transmitted waves; and
a controller configured to detect an object reflecting the plurality of transmitted waves based on transmitted signals transmitted as the plurality of transmitted waves and received signals received as the reflected waves,
wherein the controller determines discrete frequencies of the plurality of transmitted waves to be transmitted from the transmitting antenna when a temperature change rate in a unit time becomes equal to or higher than a predetermined value,
the plurality of transmitted waves have different center frequencies from each other, and
the controller selects one of the discrete frequencies of a transmitted wave to be transmitted from the transmitting antenna based on results of the reflected waves obtained by reflection of the plurality of transmitted waves.

2. The electronic device, according to claim 1, comprising a cover member configured to cover at least a part of at least one of the transmitting antenna and the receiving antenna.

3. The electronic device, according to claim 2,
wherein at least a part of the cover member is made of resin.

4. The electronic device, according to claim 2,
wherein the controller determines the frequencies of the plurality of transmitted waves to be transmitted from the transmitting antenna based on a temperature change rate in a unit time at the cover member.

5. The electronic device, according to claim 1,
wherein the controller instructs to store correspondence between the temperature change rate and a frequency of the transmitted wave to be transmitted from the transmitting antenna.

6. The electronic device, according to claim 1, comprising a storage configured to store correspondence between the temperature change rate and a frequency of the transmitted wave to be transmitted from the transmitting antenna.

7. The electronic device, according to claim 1,
wherein the controller calculates a frequency of the transmitted wave to be transmitted from the transmitting antenna based on the temperature change rate.

8. The electronic device, according to claim 1,
wherein a frequency of the transmitted wave to be transmitted at a predetermined temperature from the transmitting antenna, based on results of receiving a reflected wave, obtained by reflection of a transmitted wave transmitted from the transmitting antenna, from the receiving antenna, is associated with the predetermined temperature.

9. The electronic device, according to claim 8,
wherein the frequency of the transmitted wave to be transmitted from the transmitting antenna, based on a plurality of results of receiving each of reflected waves, obtained by reflection of a plurality of transmitted waves transmitted at different frequencies from the transmitting antenna, from the receiving antenna, is associated with the predetermined temperature.

10. The electronic device, according to claim 9,
wherein the frequency of the transmitted wave to be transmitted from the transmitting antenna, based on intensity of a received signal received as each of reflected waves obtained by reflection of the plurality of transmitted waves, is associated with the predetermined temperature.

11. The electronic device, according to claim 10,
wherein a frequency of a transmitted wave with highest intensity of a received signal received as the reflected wave among the plurality of transmitted waves is associated with the predetermined temperature as a frequency of the transmitted wave to be transmitted from the transmitting antenna.

12. A method for controlling an electronic device, including:
a step of sequentially transmitting a plurality of transmitted waves from a transmitting antenna;
a step of receiving reflected waves obtained by reflection of the plurality of transmitted waves from a receiving antenna;
a step of detecting an object reflecting the plurality of transmitted waves based on transmitted signals transmitted as the plurality of transmitted waves and received signals received as the reflected waves;
a step of determining that a temperature change rate is equal to or higher than a predetermined value;
a step of determining discrete frequencies of the plurality of transmitted waves to be transmitted from the transmitting antenna in response to the determination that the temperature change rate is equal to or higher than the predetermined value; and
a step of selecting a frequency of a transmitted wave to be transmitted from the transmitting antenna based on results of reflected waves obtained by reflection of the plurality of transmitted waves,
wherein the plurality of transmitted waves have different center frequencies from each other.

13. A non-transitory computer-readable recording medium storing computer program instructions, which when executed by a computer, cause the computer to:
sequentially transmit a plurality of transmitted waves from a transmitting antenna;
receive reflected waves obtained by reflection of the plurality of transmitted waves from a receiving antenna;
detect an object reflecting the plurality of transmitted waves based on transmitted signals transmitted as the plurality of transmitted waves and received signals received as the reflected waves;
determine discrete frequencies of the plurality of transmitted waves to be transmitted from the transmitting antenna when a temperature change rate becomes equal to or higher than a predetermined value; and
select one of the discrete frequencies of a transmitted wave to be transmitted from the transmitting antenna based on results of reflected waves obtained by reflection of the plurality of transmitted waves,
wherein the plurality of transmitted waves have different center frequencies from each other.

* * * * *